United States Patent
Pehlke et al.

(10) Patent No.: US 10,439,685 B2
(45) Date of Patent: Oct. 8, 2019

(54) FRONT-END ARCHITECTURES FOR MULTIPLE ANTENNAS

(71) Applicant: SKYWORKS SOLUTIONS, INC., Woburn, MA (US)

(72) Inventors: David Richard Pehlke, Westlake Village, CA (US); John Chi-Shuen Leung, Foothill Ranch, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 99 days.

(21) Appl. No.: 15/619,745

(22) Filed: Jun. 12, 2017

(65) Prior Publication Data

US 2017/0373730 A1    Dec. 28, 2017

Related U.S. Application Data

(60) Provisional application No. 62/348,952, filed on Jun. 12, 2016.

(51) Int. Cl.
| | | |
|---|---|---|
| *H04B 7/0404* | (2017.01) | |
| *H04B 7/0413* | (2017.01) | |
| *H04B 1/00* | (2006.01) | |
| *H04B 1/44* | (2006.01) | |

(52) U.S. Cl.
CPC ......... *H04B 7/0404* (2013.01); *H04B 1/0064* (2013.01); *H04B 1/44* (2013.01); *H04B 7/0413* (2013.01)

(58) Field of Classification Search
CPC ...... H04B 7/0404; H04B 1/44; H04B 7/0413; H04B 1/0064
See application file for complete search history.

(56) References Cited

U.S. PATENT DOCUMENTS

2014/0057559 A1* 2/2014 Smith ................. H04B 5/0037
                                                            455/41.1
2014/0329475 A1* 11/2014 Ella ....................... H04B 1/006
                                                            455/77

* cited by examiner

*Primary Examiner* — Ayodeji O Ayotunde
(74) *Attorney, Agent, or Firm* — Chang & Hale LLP

(57) ABSTRACT

Front-end architectures for multiple antennas. In some embodiments, a front-end architecture for wireless application can include a first mid-band amplifier system configured to amplify transmit and receive signals in a first mid-band. The front-end architecture can further include a second mid-band amplifier system configured to amplify at least a transmit signal in a second mid-band, such that the front-end architecture is capable of simultaneous uplink operations in the first mid-band and the second mid-band.

17 Claims, 27 Drawing Sheets

FRONT-END ARCHITECTURES FOR MULTIPLE ANTENNAS

CROSS-REFERENCE TO RELATED APPLICATION(S)

This application claims priority to U.S. Provisional Application No. 62/348,952 filed Jun. 12, 2016, entitled RADIO-FREQUENCY FRONT-END ARCHITECTURE FOR FEATURE SUPPORT TO 4 ANTENNAS, the disclosure of which is hereby expressly incorporated by reference herein in its respective entirety.

BACKGROUND

Field

The present disclosure relates to front-end architectures for wireless applications.

Description of the Related Art

In wireless applications, a signal to be transmitted is typically generated by a transceiver, amplified by a power amplifier, filtered by a filter, and routed to an antenna by a switch network. Such a signal transmitted through the antenna has a relatively high power.

In a generally reverse manner, a relatively weak signal received through an antenna is typically routed from the antenna by a switch network, filtered by a filter, amplified by a low-noise amplifier, and provided to the transceiver. In some applications, the amplification can be achieved in close proximity to the antenna to reduce loss of the relatively weak signal.

SUMMARY

In some implementations, the present disclosure relates to a front-end architecture for wireless application. The front-end architecture includes a first module having a low-band power amplifier with integrated duplexer, a second module having a power amplifier with integrated duplexer and configured to provide uplink carrier-aggregation, and a plurality of third modules each having a power amplifier with integrated duplexer for a mid-low-band or higher frequency band. The front-end architecture further includes a first power management unit implemented to provide supply voltage for each of the first module and the second module, and a second power management unit implemented to provide supply voltage for each of the plurality of third modules.

In some embodiments, the third modules can include a mid-low-band power amplifier with integrated duplexer. In some embodiments, the third modules can include a mid-band power amplifier with integrated duplexer. In some embodiments, the third modules can include a high-band power amplifier with integrated duplexer. In some embodiments, the third modules can include an ultra-high-band power amplifier with integrated duplexer.

In some embodiments, each of the first and second power management units can be configured to support envelope tracking operation. In some embodiments, one of the first and second power management units can be configured to support envelope tracking operation, and the other power management unit can be configured to support average power tracking operation.

In some embodiments, the front-end architecture can be configured to provide uplink carrier aggregation with at least two bands among the low-band and the mid-low-band or higher frequency band. In some embodiments, the front-end architecture can be configured to provide downlink carrier aggregation with at least three bands among the low-band and the mid-low-band or higher frequency band.

According to some teachings, the present disclosure relates to a method for operating a front-end of a wireless device. The method includes providing a low-band power amplifier with integrated duplexer, a power amplifier with integrated duplexer configured to provide uplink carrier-aggregation, a mid-low-band power amplifier with integrated duplexer, and a plurality of power amplifiers each with an integrated duplexer for a mid-low-band or higher frequency band. The method further includes supplying a supply voltage for each of the low-band power amplifier and the power amplifier configured to provide the uplink carrier aggregation. The method further includes separately supplying a supply voltage for at least some of the mid-low or higher frequency band power amplifiers.

In accordance with a number of implementations, the present disclosure relates to a wireless device that includes a transceiver configured to generate a plurality of transmit signals and process a plurality of received signals, and a plurality of antennas configured to facilitate transmission of the transmit signals and reception of the received signals. The wireless device further includes a front-end system implemented between the transceiver and the plurality of antennas. The front-end system includes a first module having a low-band power amplifier with integrated duplexer, a second module having a power amplifier with integrated duplexer and configured to provide uplink carrier-aggregation, and a plurality of third modules each having a power amplifier with integrated duplexer for a mid-low-band or higher frequency band. The front-end system further includes a first power management unit implemented to provide supply voltage for each of the first module and the second module, and a second power management unit implemented to provide supply voltage for each of the plurality of third modules.

In some embodiments, the wireless device can be, for example, a cellular phone.

In a number of implementations, the present disclosure relates to a front-end architecture for wireless application. The front-end architecture includes a first module having a high-band power amplifier with integrated duplexer, a second module having a power amplifier with integrated duplexer and configured to provide uplink carrier-aggregation, and a plurality of third modules each having a power amplifier with integrated duplexer for a non-high-band. The front-end architecture further includes a first power management unit implemented to provide supply voltage for each of the first module and the second module, and a second power management unit implemented to provide supply voltage for each of the plurality of third modules.

In some embodiments, the third modules can include a low-band power amplifier with integrated duplexer. In some embodiments, the third modules can include a mid-low-band power amplifier with integrated duplexer. In some embodiments, the third modules can include a mid-band power amplifier with integrated duplexer. In some embodiments, the third modules can include an ultra-high-band power amplifier with integrated duplexer.

In some embodiments, each of the first and second power management units can be configured to support envelope tracking operation. In some embodiments, one of the first and second power management units can be configured to support envelope tracking operation, and the other power management unit can be configured to support average power tracking operation.

In some embodiments, the front-end architecture can be configured to provide uplink carrier aggregation with at least two bands among the high-band and the non-high-bands. In some embodiments, the front-end architecture can be configured to provide downlink carrier aggregation with at least three bands among the high-band and the non-high-bands.

In some teachings, the present disclosure relates to a method for operating a front-end of a wireless device. The method includes providing a high-band power amplifier with integrated duplexer, a power amplifier with integrated duplexer configured to provide uplink carrier-aggregation, and a plurality of power amplifiers each with an integrated duplexer for a non-high-band. The method further includes supplying a supply voltage for each of the high-band power amplifier and the power amplifier configured to provide the uplink carrier aggregation. The method further includes separately supplying a supply voltage for at least some of the non-high-band power amplifiers.

In some implementations, the present disclosure relates to a wireless device that includes a transceiver configured to generate a plurality of transmit signals and process a plurality of received signals, and a plurality of antennas configured to facilitate transmission of the transmit signals and reception of the received signals. The wireless device further includes a front-end system implemented between the transceiver and the plurality of antennas. The front-end system includes a first module having a high-band power amplifier with integrated duplexer, a second module having a power amplifier with integrated duplexer and configured to provide uplink carrier-aggregation, and a plurality of third modules each having a power amplifier with integrated duplexer for a non-high-band. The front-end system further includes a first power management unit implemented to provide supply voltage for each of the first module and the second module, and a second power management unit implemented to provide supply voltage for each of the plurality of third modules.

In some embodiments, the wireless device can be, for example, a cellular phone.

In accordance with a number of implementations, the present disclosure relates to a front-end architecture for wireless application. The front-end architecture includes a first mid-band amplifier system configured to amplify transmit and receive signals in a first mid-band. The front-end architecture further includes a second mid-band amplifier system configured to amplify at least a transmit signal in a second mid-band, such that the front-end architecture is capable of simultaneous uplink operations in the first mid-band and the second mid-band.

In some embodiments, the front-end architecture can further include a low-band amplifier system configured to amplify transmit and receive signals in a low-band, such that the front-end architecture is capable of simultaneous uplink operations in the low-band and one of the first mid-band and the second mid-band. In some embodiments, the front-end architecture can further include a high-band amplifier system configured to amplify transmit and receive signals in a high-band, such that the front-end architecture is capable of simultaneous uplink operations in the high-band and one of the first mid-band and the second mid-band.

In some embodiments, the front-end architecture can further include a low-band amplifier system configured to amplify transmit and receive signals in a low-band, and a high-band amplifier system configured to amplify transmit and receive signals in a high-band, such that the front-end architecture is capable of simultaneous uplink operations in the low-band and the high-band.

In some embodiments, the second mid-band amplifier system can be further configured to amplify a transmit signal in a third mid-band. The second mid-band amplifier system can include a separate band-pass filter for a transmit portion of each of the second mid-band and the third mid-band. The second mid-band amplifier system can be further configured to amplify a received signal in each of the second mid-band and the third mid-band. The second mid-band amplifier system can include a first duplexer for transmit and receive portions of the second mid-band, and a second duplexer for transmit and receive portions of the third mid-band. The first duplexer and the second duplexer can be implemented together as a quadplexer.

In some embodiments, the front-end architecture can be configured to be capable of simultaneous downlink operations in the low-band, the high-band, and one of the first and second mid-bands. The front-end architecture can be configured to support at least three antennas, with two of the at least three antennas being implemented in close proximity to the first mid-band amplifier system, and the at least one remaining antenna being implemented at a distant location from the two antennas. For example, the front-end architecture can be configured to support four antennas such that a first antenna and a second antenna are in close proximity to the first mid-band amplifier system, and a third antenna and a fourth antenna are at respective distant locations from the first and second antennas.

In some embodiments, uplink operation of each of the first mid-band amplifier system and the high-band amplifier system can be facilitated by either of the first or second of the two antennas. Uplink operation of the low-band amplifier system is facilitated by the second antenna.

In some embodiments, uplink operation of the second mid-band amplifier system can be facilitated by the first antenna or the second antenna. The second mid-band amplifier system can be implemented in close proximity to the first antenna and the second antenna.

In some embodiments, uplink operation of the second mid-band amplifier system can be facilitated by the third antenna. The second mid-band amplifier system can be implemented in close proximity to the third antenna.

In some embodiments, the front-end architecture can further include a first power management unit and a second power management unit, with each being configured to provide supply power to some of the first and second mid-band amplifier systems, the low-band amplifier system, and the high-band amplifier system.

In some embodiments, each of the first and second power management units can be configured to provide supply power for envelope tracking operation. For example, the first power management unit can be configured to provide supply power to the high-band amplifier system and the second mid-band amplifier system, and the second power management unit can be configured to provide supply power to the low-band amplifier system and the second mid-band amplifier system.

In some embodiments, the first power management unit can be configured to provide supply power for average power tracking operation, and the second power management unit can be configured to provide supply power for envelope tracking operation. For example, the first power management unit can be configured to provide supply power to the low-band amplifier system and the second mid-band amplifier system, and the second power management unit can be configured to provide supply power to the high-band amplifier system and the second mid-band amplifier system. In some embodiments, the average power tracking operation can include a high-voltage average power tracking operation.

In some teachings, the present disclosure relates to a method for operating a front-end of a wireless device. The method includes amplifying transmit and receive signals in a first mid-band, and amplifying at least a transmit signal in a second mid-band, such that the front-end architecture supports simultaneous uplink operations in the first mid-band and the second mid-band.

In a number of implementations, the present disclosure relates to a wireless device that includes a transceiver configured to generate a plurality of transmit signals and process a plurality of received signals, and a plurality of antennas configured to facilitate transmission of the transmit signals and reception of the received signals. The wireless device further includes a front-end system implemented between the transceiver and the plurality of antennas. The front-end system includes a first mid-band amplifier system configured to amplify transmit and receive signals in a first mid-band. The front-end system further includes a second mid-band amplifier system configured to amplify at least a transmit signal in a second mid-band, such that the front-end architecture is capable of simultaneous uplink operations in the first mid-band and the second mid-band.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Introduction:

Described herein are various examples related to radio-frequency (RF) front-end architectures for operations of a wireless device having multiple antennas. For example, such a wireless device can include four antennas. Although various examples are described in the context of four antennas, it will be understood that one or more features of the present disclosure can also be implemented for wireless devices having other numbers of antennas. It will also be understood that not all of such four antennas necessarily need to be utilized when one or more features of the present disclosure is/are implemented in the wireless device.

Figure 1:
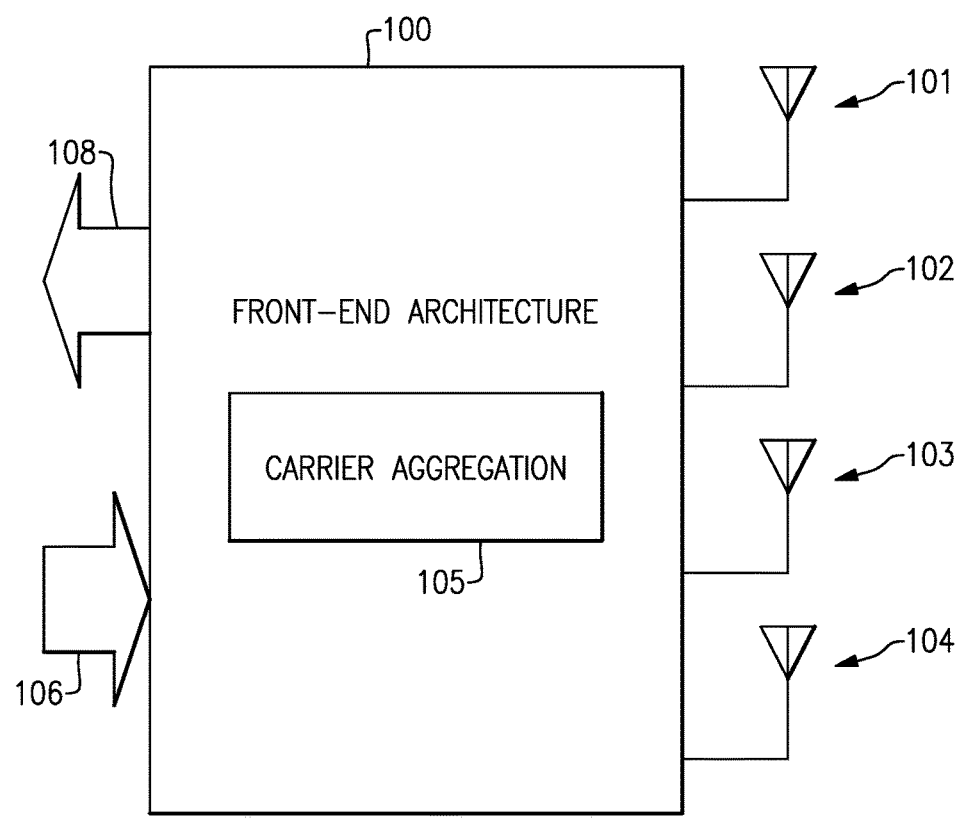
FIG. 1 depicts a front-end architecture having one or more features as described herein, and configured to support multiple antennas.

FIG. 1 depicts a front-end architecture 100 having one or more features as described herein, and configured to support multiple antennas. More particularly, the front-end architecture 100 is shown to be coupled to four antenna 101, 102, 103, 104. Each of such antennas can facilitate transmit (TX) and/or receive (RX) operations through the front-end architecture 100.

For transmit operations, the front-end architecture 100 can be in communication with, for example, a transceiver to receive, process, and route one or more transmit signals to one or more of the antennas 101, 102, 103, 104. In FIG. 1, such one or more transmit signals are collectively depicted as an arrow 106.

For transmit operations, the front-end architecture 100 can receive one or more signals from one or more of the antennas 101, 102, 103, 104, process such signal(s), and route such processed signal(s) to, for example, a transceiver which may or may not be the same as the foregoing transceiver associated with the transmit operations. In FIG. 1, such one or more received signals are collectively depicted as an arrow 108.

FIG. 1 also shows that the front-end architecture 100 can include a carrier aggregation (CA) functionality. Such a carrier aggregation functionality can include an uplink (UL) carrier aggregation (UL CA) functionality and/or a downlink (DL) carrier aggregation (DL CA) functionality. For the purpose of description, it will be understood that in a given CA functionality, a plurality of signals associated with the CA functionality may or may not share a common antenna or a common signal path.

Various examples of front-end architectures are described herein. More particularly, FIGS. 2-8 are related to a first example of the front-end architecture 100 of FIG. 1, in which a plurality of power management units support low-band, mid-band, and high-band components, and in which a first example mid-band uplink carrier aggregation component is utilized. FIGS. 9-15 are related to a second example of the front-end architecture 100 of FIG. 1, in which a plurality of power management units support low-band, mid-band, and high-band components, and in which a second example mid-band uplink carrier aggregation component is utilized. FIGS. 16-22 are related to a third example of the front-end architecture 100 of FIG. 1, in which a plurality of power management units support low-band, mid-band, and high-band components, and in which a third example mid-band uplink carrier aggregation component is utilized. FIGS. 23-27 are related to a fourth example of the front-end architecture that is similar to the third example associated with FIGS. 16-22, but in which the third example mid-band uplink carrier aggregation component is coupled to a different antenna.

For the purpose of description, following assumptions can be made. First, a given platform solution can be assumed to support full hot-swapping that enables a front-end architecture to be desirably configured for connectivity and active path selection. For example, primary component carrier(s) (PCC) can be supported by an uplink carrier aggregation (UL CA) module or component, and secondary component carrier(s) (SCC) can be supported by a primary module or component, or vice versa. In another example, transmit (TX) and receive (RX) operations do not necessarily need to share the same path (e.g., TX can be from an UL CA module, RX can be from the UL CA module, primary module, or a secondary RX module).

Second, four antennas are assumed to be available with the following defined band support listed in Table 1.

TABLE 1

| Antenna | Band support |
|---|---|
| Ant 1 | MB/HB/UHB/eLAA |
| Ant 2 | LB/MB/MLB/HB/UHB/eLAA |
| Ant 3 | MB/HB/UHB/eLAA |
| Ant 4 | LB/MB/MLB/HB/UHB/eLAA |

Table 2 lists examples of frequency ranges referenced in Table 1. It will be understood that one or more features of the present disclosure can also be implemented with other frequency ranges of the various example bands.

TABLE 2

| Band | Example frequency range |
|---|---|
| LB (low-band) | 698-960 MHz |
| MLB (mid-low-band) | 1427-1518 MHz |
| MB (mid-band) | 1710-2200 MHz |
| HB (high-band) | 2300-2690 MHz |
| UHB (ultra-high-band) | 3400-3800 MHz |
| eLAA (enhanced LAA) | 5150-5925 MHz |

For the purpose of description, low, mid and high bands are referred to herein as LB, MB and HB, or simply as L, M and H, respectively. The latter set of abbreviations are utilized herein for combinations of bands. For example, LM refers to a combination of LB and MB, LMH refers to a combination of LB, MB and HB, etc.

In some embodiments, a front-end architecture or system having one or more features as described herein can include some or all of the following. First, in some embodiments, a system can be configured for simultaneous operations of LM UL CA and LMH DL CA; simultaneous operations of LH UL CA and LMH DL CA; simultaneous operations of MH UL CA and LMH DL CA; and simultaneous operations of MM UL CA and LMMH DL CA.

Second, in some embodiments, a single module can be configured to flexibly support all possible UL CA operations.

Third, in some embodiments, flexible support of 4×4 and higher order MIMO (multiple-input multiple-output) for bands greater than 1710 MHz can be implemented.

Fourth, in some embodiments, any duplication of filtering/RX paths can be minimized or reduced for smallest or reduced size and/or cost. In such a configuration, TX-only filtering in an UL CA module (e.g., as opposed to full duplexers/quadplexers) can be implemented. Also, lowers cost and/or smaller size UL CA solution can be realized, as well as much lower TX insertion loss (IL) for UL CA path(s).

Fifth, in some embodiments, insertion loss across all band support and CA support configurations can be minimized or reduced.

Sixth, in some embodiments, maximal or increased use of antenna isolation for enhanced performance in CA combinations can be realized.

In some embodiments, one or more features of the present disclosure can be implemented in various connectivity configurations. Five non-limiting examples are described herein.

Connectivity Example 1

In some embodiments, a front-end architecture can include two power management units (PMUs) that deliver supply voltage to integrated power amplifier (PA) modules and be utilized to adjust the power of two active TX paths independently for overall power efficiency. By way of examples, partitioning of power supply connectivity can be implemented as listed in Table 3.

TABLE 3

| Option 1 | PMU #1: LB PAiD/UL CA PAiD |
| | PMU #2: MLB PAiD/MB PAiD/HB PAiD/UHB PAiD |
| Option 2 | PMU #1: HB PAiD/UL CA PAiD |
| | PMU #2: LB PAiD/MLB PAiD/MB PAiD/UHB PAiD |

It is noted that PAiD in Table 3 refers to power amplifier with integrated duplexer, and additional details concerning such PAiDs are described herein. However, it will be understood that integration of a duplexer with a power amplifier is not necessarily required in a front-end architecture having one or more features as described herein.

It is also noted that a given PMU can be configured to support an envelope tracking (ET) operation or an average power tracking (APT) operation in a corresponding power amplifier. In the latter case, the APT operation can include a high-voltage (HV) APT operation.

Connectivity Example 2

In some embodiments, advanced phones required to support 4×4 DL MIMO (multiple-input multiple-output) can include four antennas. One or more features of the present disclosure can be configured to optimize or enhance connectivity to these available antennas. Some designs can include a multi-throw high isolation/high linearity switch for antenna selection. Some designs can use shared MB/HB frequencies supported on both antennas by enabling switch function to connect those bands to either antenna.

Connectivity Example 3

In some embodiments, a front-end architecture can be implemented to enable TX-only filtering in an UL CA PAiD (PA with integrated duplexer) by providing an RX active path connections to a MB PAiD and/or an additional MB/HB MIMO RX module. In some applications, such modules can be utilized in the main functional feature support already, and thus can be used to support these RX paths.

Connectivity Example 4

In some embodiments, fixed voltage supply power amplifier implementations (e.g., APT (average power tracking)) can leverage a capability to support power amplifier modules on two sides of a wireless device (e.g., a cellular phone) with a single PMU. Such a single PMU can be implemented on one side of the wireless device to supply local power amplifier modules, but also run a supply across the wireless device to a geographically distant power amplifier module (e.g., on the other side of the wireless device). It is noted that ET (envelope tracking) approaches typically cannot operate as such due to amplitude/phase delay mismatch and signal conditioning sensitivities.

In some embodiments, a voltage dropout from one side of the wireless device to the other side can be managed in the wireless device. This voltage dropout is even less for higher voltage supply approaches implemented for APT, where a supply voltage can be up to as much as three times the battery voltage. It is noted that much higher power, improved thermal spreading and SAR (specific absorption rate) margin can be achieved by transmitting at opposite ends of the wireless device with two TX carriers. It is further noted that the PMU capability to service TX modules at both ends of the wireless device can enable improved connectivity in terms of, for example, insertion loss, intermodulation distortion (IMD), isolation, etc.

Connectivity Example 5

In some embodiments, by connecting a UL CA PAiD in a TX bypass portion (e.g., a throw) of an antenna switch of a far MIMO higher order diversity module, secondary MB/HB TX can be connected to an available antenna with minimal or reduced coexistence interference with another active TX path, and critical primary and diversity active RX paths. In this connectivity example, the UL CA PAiD TX can be connected to the antenna, and the MIMO higher order diversity module can be disconnected and become inactive. It is noted that it is less critical in this configuration than the secondary UL CA TX, and the required active RX paths can be supported on other antennas through other RX modules. Much higher power, improved thermal spreading, and improved SAR margin can be achieved by transmitting at opposite ends of the wireless device with the two TX carriers.

Example 1 of Front-End Architecture

In some embodiments, a first example front-end architecture can include a plurality of power management units (PMUs) that provide power independently to corresponding groups of power amplifier modules. Such PMUs can include an envelope tracking (ET) PMU, an average power tracking (APT) PMU, or some combination thereof. In some embodiments, the APT PMU can include a high-voltage output for high-voltage APT operation of the corresponding power amplifier module(s).

In some embodiments, the first example front-end architecture can include functionalities described herein under the Connectivity Example 1 section. More particularly, in some embodiments, the first example front-end architecture can be configured to have two PMUs provide power to two groups of power amplifier modules as listed in Option 1 of Table 3.

Figure 16:
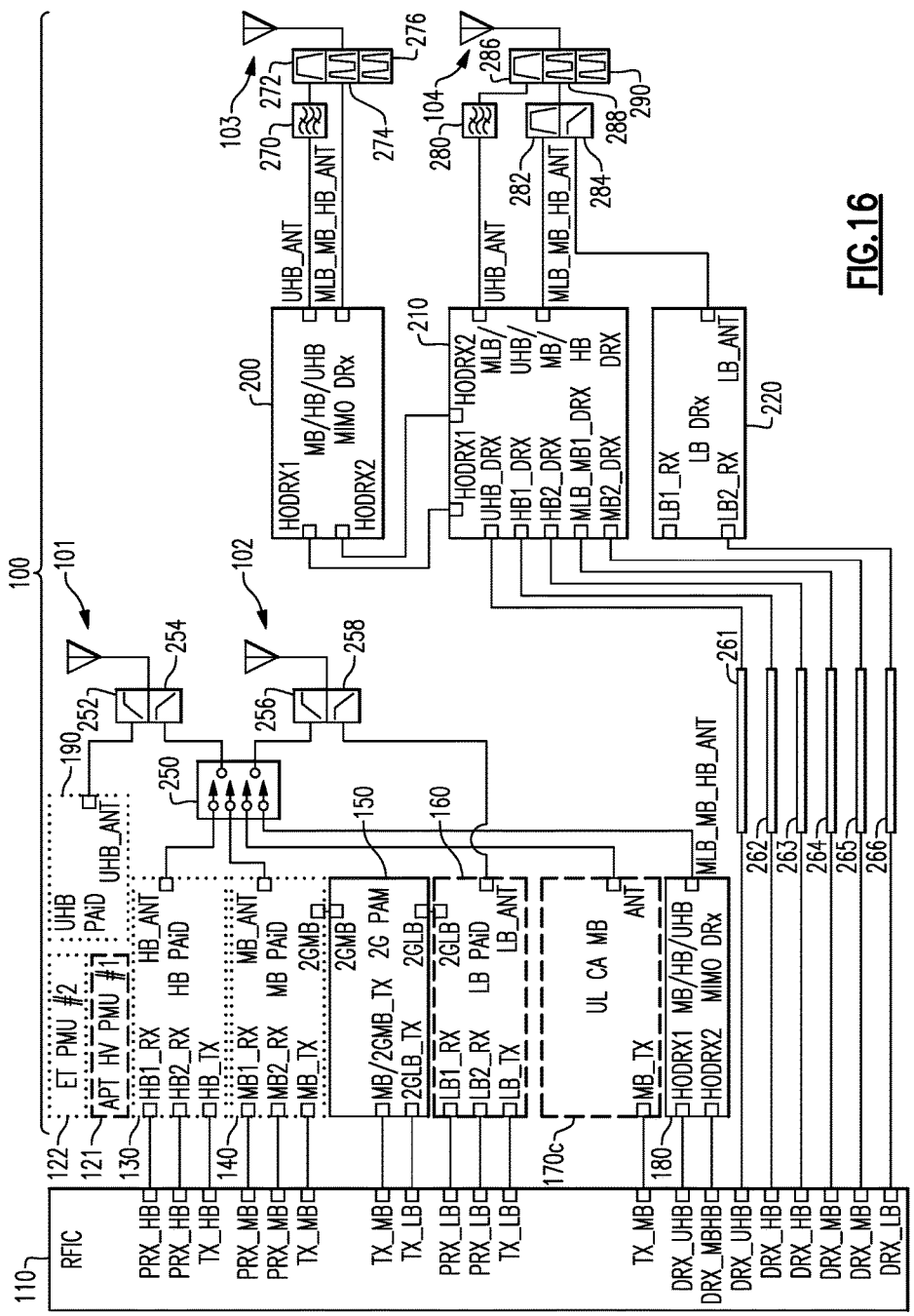
FIG. 16 shows yet another more detailed example of the front-end architecture of FIG. 1, in which a plurality of power management units support low-band, mid-band, and high-band components, and in which a third example mid-band uplink carrier aggregation component is utilized.
Figure 23:
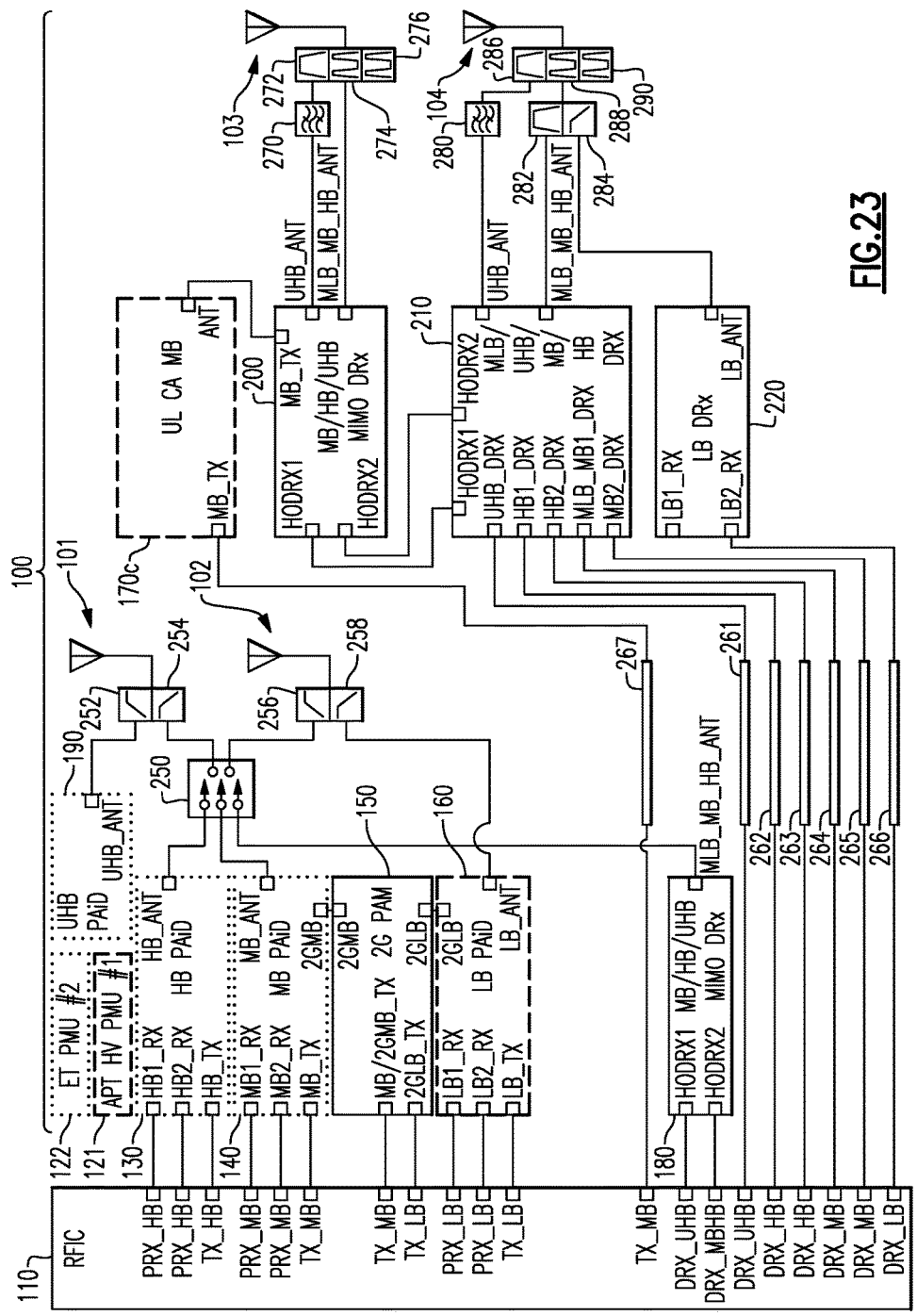
FIG. 23 shows an example front-end architecture that is similar to the example of FIG. 16, but in which the third example mid-band uplink carrier aggregation component is coupled to a different antenna.

It is noted that FIGS. 16 and 23 as described herein are non-limiting examples of the first example front-end architecture. Additional details concerning such front-end architectures are described herein in greater detail.

Example 2 of Front-End Architecture

In some embodiments, a second example front-end architecture can include a plurality of power management units (PMUs) that provide power independently to corresponding groups of power amplifier modules. Such PMUs can include an envelope tracking (ET) PMU, an average power tracking (APT) PMU, or some combination thereof. In some embodiments, the APT PMU can include a high-voltage output for high-voltage APT operation of the corresponding power amplifier module(s).

In some embodiments, the second example front-end architecture can include functionalities described herein under the Connectivity Example 1 section. More particularly, in some embodiments, the second example front-end architecture can be configured to have two PMUs provide power to two groups of power amplifier modules as listed in Option 2 of Table 3.

Figure 2:
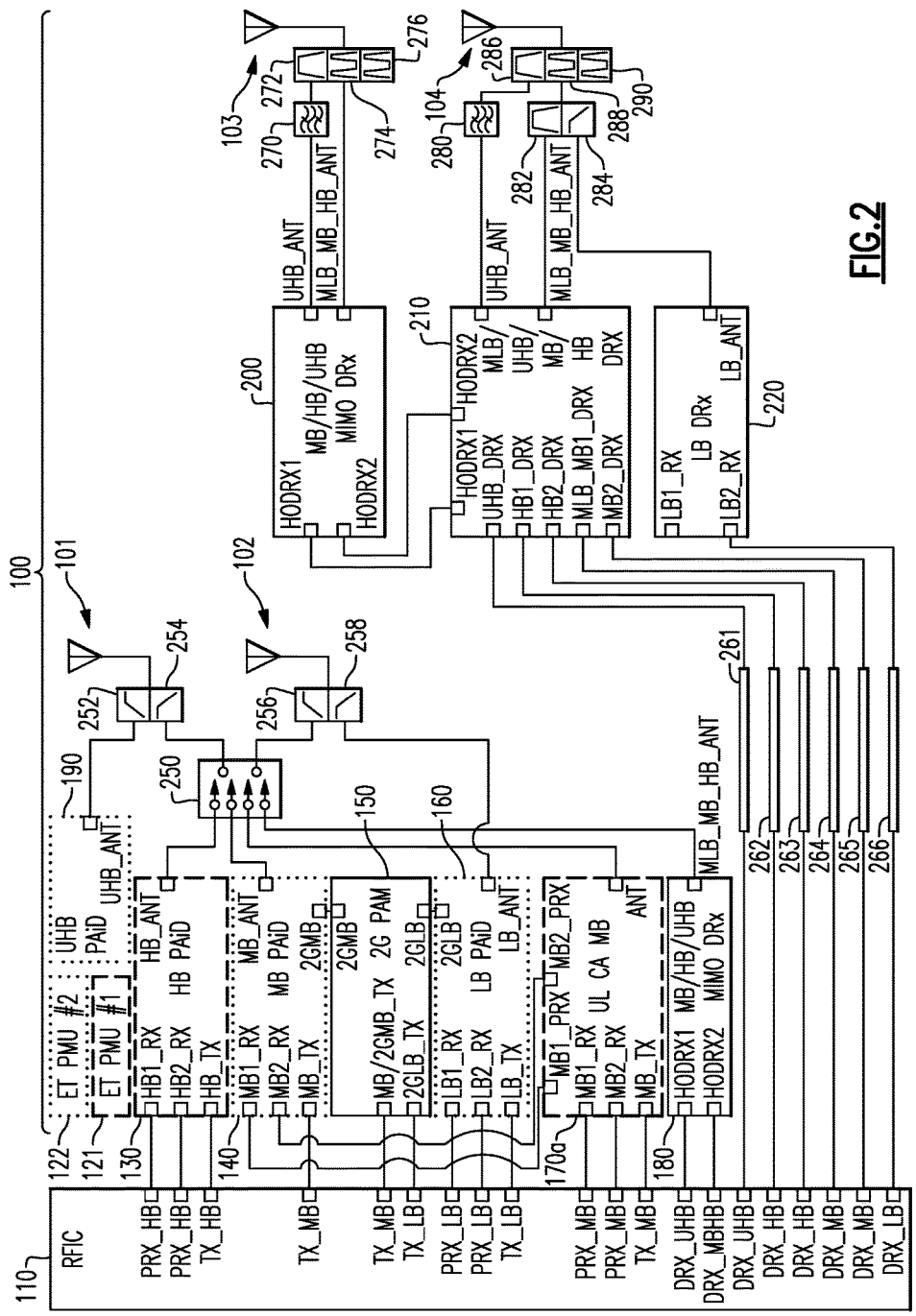
FIG. 2 shows a more detailed example of the front-end architecture of FIG. 1, in which a plurality of power management units support low-band, mid-band, and high-band components, and in which a first example mid-band uplink carrier aggregation component is utilized.
Figure 9:
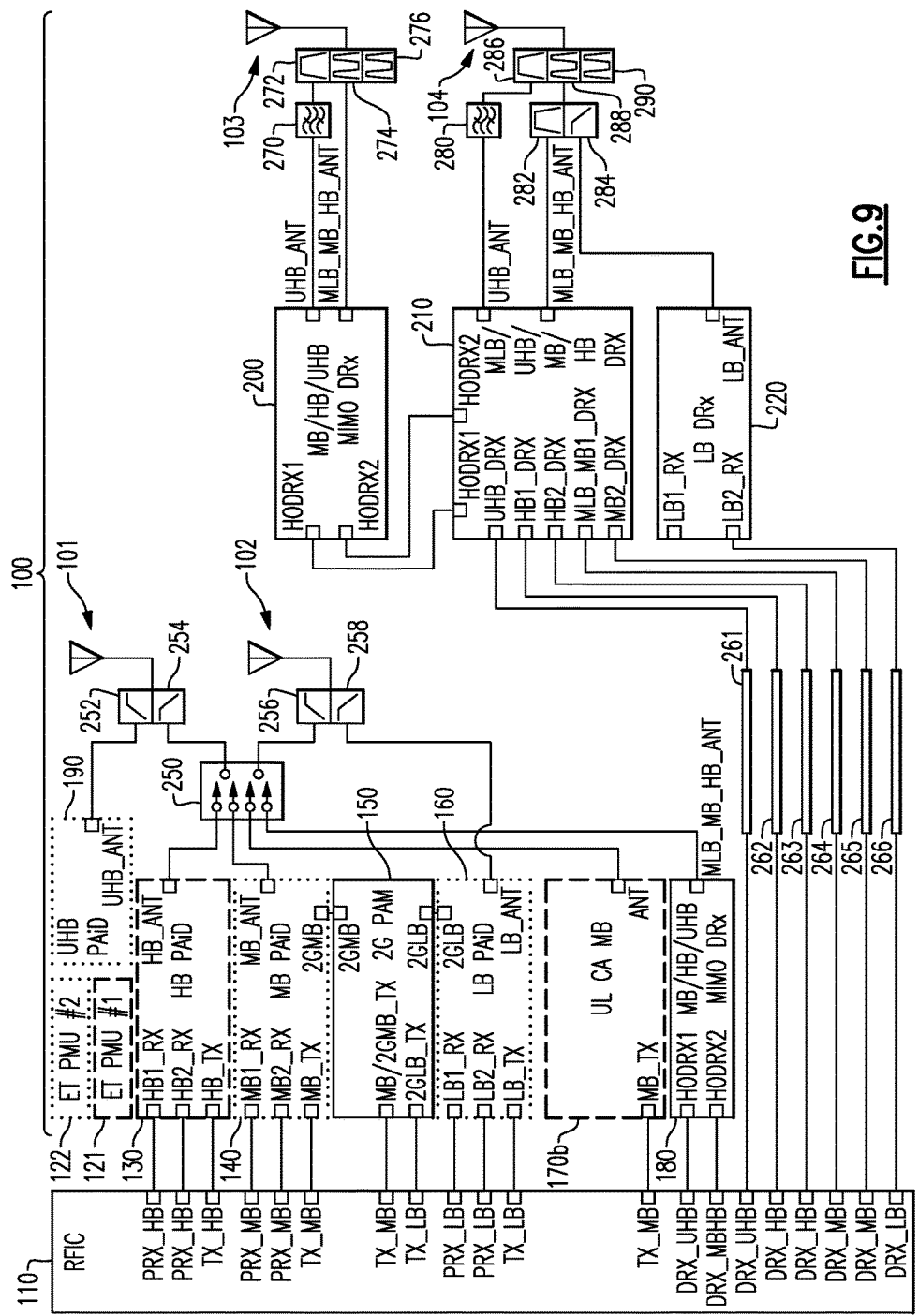
FIG. 9 shows another more detailed example of the front-end architecture of FIG. 1, in which a plurality of power management units support low-band, mid-band, and high-band components, and in which a second example mid-band uplink carrier aggregation component is utilized.

It is noted that FIGS. 2 and 9 as described herein are non-limiting examples of the second example front-end architecture. Additional details concerning such front-end architectures are described herein in greater detail.

Example 3 of Front-End Architecture

FIG. 2 shows a third example front-end architecture 100 that can be implemented to provide various transmit (TX) and receive (RX) functionalities with a radio-frequency integrated circuit (RFIC) 110 and multiple antennas. In some embodiments, the RFIC 110 can be part of, or be associated with, a transceiver. In the example of FIG. 2, the multiple antennas can include four antennas 101, 102, 103, 104. Examples related to use of some or all of such antennas are described herein in greater detail.

In the example of FIG. 2, the front-end architecture 100 is shown to include two separate PMUs. The first PMU 121 is indicated by a dashed box, and is configured to supply power amplifiers in ET operations. For example, a HB PAiD module or component 130 (also indicated by a dashed box) can be provided with ET supply voltage from the first PMU 121 for one or more power amplifiers therein for high-band operations. In another example, an UL CA MB module or component 170a (also indicated by a dashed box) can be provided with ET supply voltage from the first PMU 121 for one or more power amplifiers therein for mid-band operations.

The second PMU 122 is indicated by a dotted box, and is configured to supply power amplifiers in ET operations. For example, an UHB PAiD module or component 190 (also indicated by a dotted box) can be provided with ET supply voltage from the second PMU 122 for one or more power amplifiers therein for ultra-high-band operations. In another example, a MB PAiD module or component 140 (also indicated by a dotted box) can be provided with ET supply voltage from the second PMU 122 for one or more power amplifiers therein for mid-band operations. In yet another example, a LB PAiD module or component 160 (also indicated by a dotted box) can be provided with ET supply voltage from the second PMU 122 for one or more power amplifiers therein for low-band operations.

In the example of FIG. 2, the HB PAiD module 130 can be configured to include a high-band amplification functionality. Accordingly, a HB_TX pin can be provided to allow a connection with a TX_HB pin of the RFIC 110, and thereby receive a high-band signal for amplification. Such an amplified high-band signal can be output through an antenna pin HB_ANT which can be coupled to a first antenna 101 or a second antenna 102 through a switch 250.

The HB PAiD module 130 can be further configured to process received signals in a plurality of high-bands. Each high-band signal can be received from the first antenna 101 or the second antenna 102 through the switch 250 and be amplified by a low-noise amplifier (LNA). The first high-band has associated with it an output pin HB1_RX, and the second high-band has associated with it an output pin HB2_RX. The output pins HB1_RX and HB2_RX can be coupled to respective pins PRX_HB to thereby allow routing of the amplified received signal(s) to a primary receiver circuitry of the RFIC 110.

Figure 28:
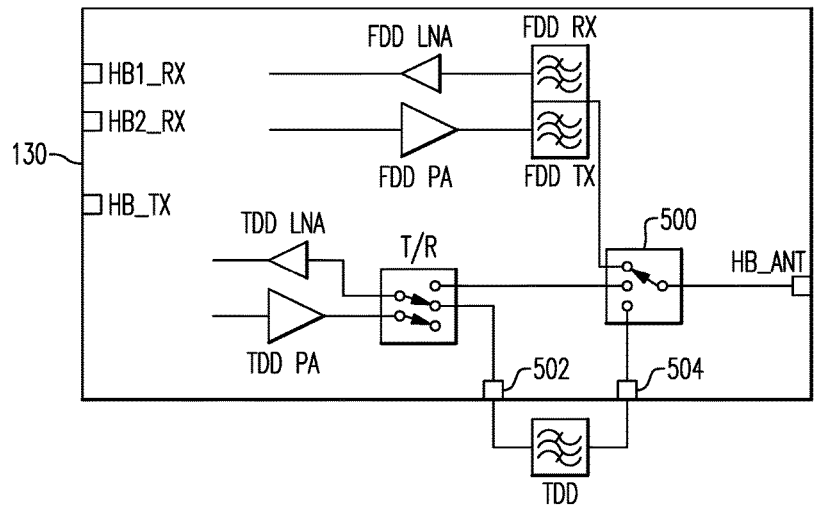
FIG. 28 shows an example of a high-band component that can be utilized in the front-end architectures as described herein.

FIG. 28 shows a more detailed example of the HB PAiD module 130. As described herein, such a high-band module can be configured to provide frequency-division duplexing (FDD) functionality or time-division duplexing (TDD) functionality.

In the example of FIG. 2, the MB PAiD module 140 can be configured to include a mid-band amplification functionality. Accordingly, a MB_TX pin can be provided to allow a connection with a TX_MB pin of the RFIC 110, and thereby receive a mid-band signal for amplification. Such an amplified mid-band signal can be output through an antenna pin MB_ANT which can be coupled to the first antenna 101 or the second antenna 102 through the switch 250.

The MB PAiD module 140 can be further configured to process received signals in a plurality of mid-bands. Each mid-band signal can be received from the first antenna 101 or the second antenna 102 through the switch 250 and be amplified by a low-noise amplifier (LNA). The first mid-band has associated with it an output pin MB1_RX, and the second mid-band has associated with it an output pin MB2_RX. The output pins MB1_RX and MB2_RX can be coupled to respective pins PRX_MB to thereby allow routing of the amplified received signal(s) to a primary receiver circuitry of the RFIC 110.

In the example of FIG. 2, such coupling of the output pins MB1_RX and MB2_RX of the MB PAiD module 140 to the pins PRX_MB of the RFIC 110 is shown to be achieved through the first example UL CA MB module 170a. More particularly, the output pins MB1_RX and MB2_RX of the MB PAiD module 140 are shown to be coupled to input pins MB1_PRX and MB2_PRX of the UL CA MB module 170. Within the UL CA MB module 170 the input pins MB1_PRX and MB2_PRX can be coupled to output pins MB1_RX and MB2_RX that are in turn coupled to the PRX_MB pins of the RFIC 110.

Figure 29:
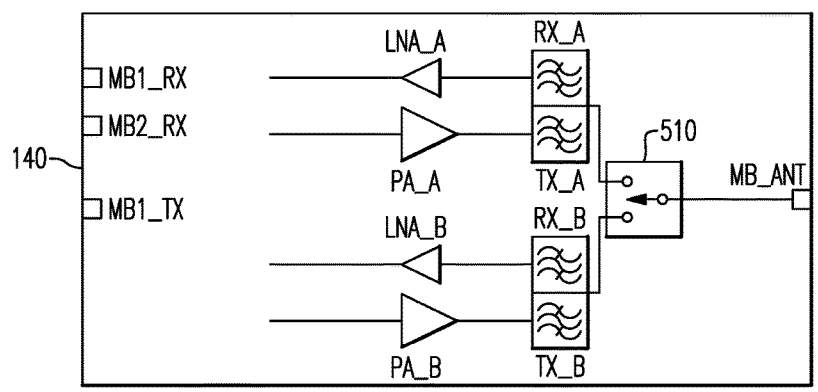
FIG. 29 shows an example of a mid-band component that can be utilized in the front-end architectures as described herein.

FIG. 29 shows a more detailed example of the MB PAiD module 140. As described herein, such a mid-band module can include separate PA/LNA pairs for each of a plurality of mid-bands.

In the example of FIG. 2, the LB PAiD module 160 can be configured to include a low-band amplification functionality. Accordingly, a LB_TX pin can be provided to allow a connection with a TX_LB pin of the RFIC 110, and thereby receive a low-band signal for amplification. Such an amplified low-band signal can be output through an antenna pin LB_ANT which is shown to be coupled to the second antenna 102.

The LB PAiD module 160 can be further configured to process received signals in a plurality of low-bands. Each low-band signal can be received from the second antenna 102 and be amplified by a low-noise amplifier (LNA). The first low-band has associated with it an output pin LB1_RX, and the second low-band has associated with it an output pin LB2_RX. The output pins LB1_RX and LB2_RX can be coupled to respective pins PRX_LB to thereby allow routing of the amplified received signal(s) to a primary receiver circuitry of the RFIC 110.

In the example of FIG. 2, the example UL CA MB module 170a can be configured to include a mid-band amplification functionality. Accordingly, a MB_TX pin can be provided to allow a connection with a TX_MB pin of the RFIC 110, and thereby receive a mid-band signal for amplification. Such an amplified mid-band signal can be output through an antenna pin ANT which can be coupled to the first antenna 101 or the second antenna 102 through the switch 250.

The example UL CA MB module 170a of FIG. 2 can be further configured to process received signals in a plurality of mid-bands. Each mid-band signal can be received from the first antenna 101 or the second antenna 102 through the switch 250 and be amplified by a low-noise amplifier (LNA). The first mid-band has associated with it an output pin MB1_RX, and the second mid-band has associated with it an output pin MB2_RX. The output pins MB1_RX and MB2_RX can be coupled to respective pins PRX_MB to thereby allow routing of the amplified received signal(s) to a primary receiver circuitry of the RFIC 110.

Figure 3:
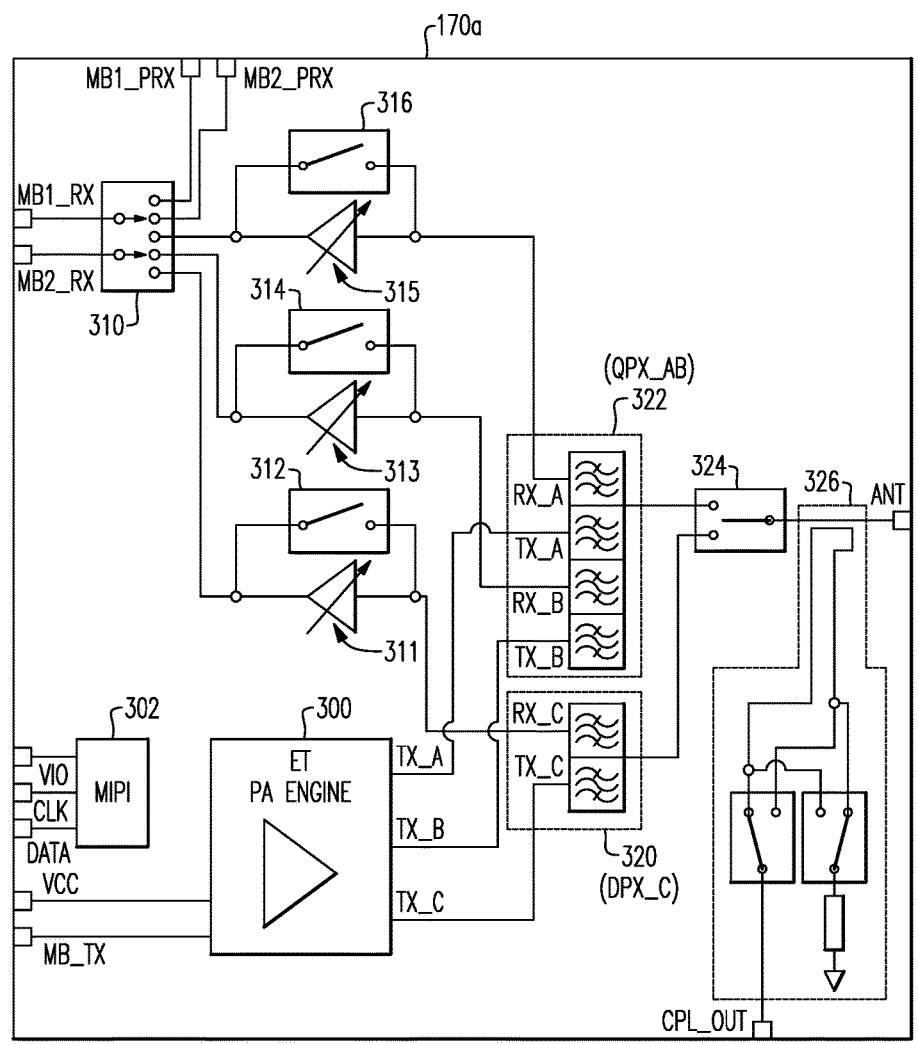
FIG. 3 shows an example of the first mid-band uplink carrier aggregation component of FIG. 2.
Figure 4:
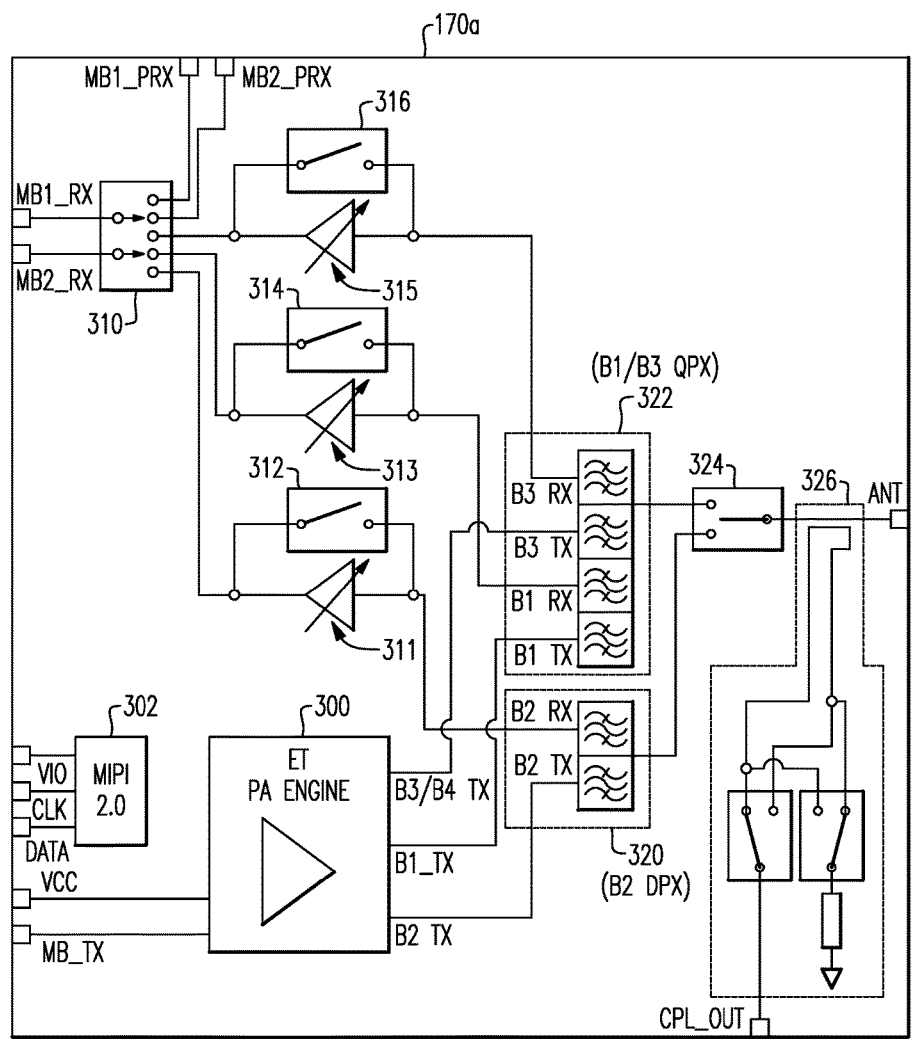
FIG. 4 shows a more specific example of the first mid-band uplink carrier aggregation component of FIG. 3.

FIGS. 3 and 4 show more detailed examples of the UL CA MB module 170a. As described herein, such a mid-band module can include a quadplexer to provide TX/RX duplex functionality for each of two mid-bands.

In the example of FIG. 2, the 2G PAM module 150 can be configured to include amplification functionality for a 2G low-band and a 2G mid-band. Accordingly, a MB/2GMB_TX pin can be provided to allow a connection with a TX_MB pin of the RFIC 110, and thereby receive a 2G mid-band signal for amplification. Similarly, a 2GLB_TX pin can be provided to allow a connection with a TX_LB pin of the RFIC 110, and thereby receive a 2G low-band signal for amplification.

The amplified 2G mid-band signal can be output through a pin 2GMB which can be coupled to a 2GMB pin of the MB PAiD module 140, and be routed to the MB_ANT pin of the MB PAiD module 140. Accordingly, the amplified 2G mid-band signal can be further routed to the first antenna 101 or the second antenna 102 through the switch 250. Similarly, the amplified 2G low-band signal can be output through a pin 2GLB which can be coupled to a 2GLB pin of the LB PAiD module 160, and be routed to the LB_ANT pin of the LB PAiD module 160. Accordingly, the amplified 2G low-band signal can be further routed to the second antenna 102.

Figure 30:
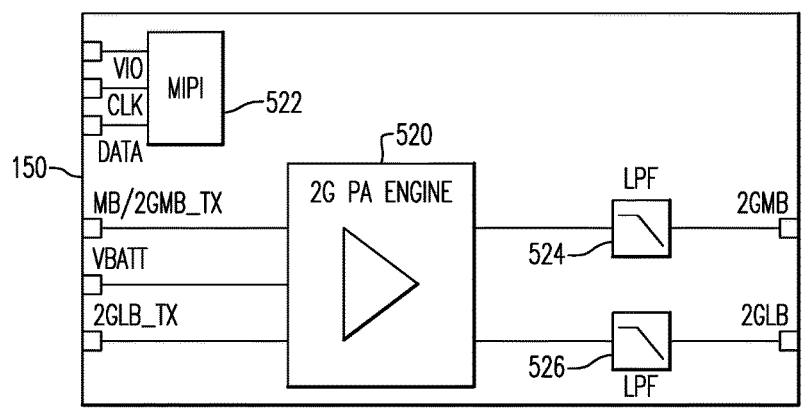
FIG. 30 shows an example of a 2G component that can be utilized in the front-end architectures as described herein.

FIG. 30 shows a more detailed example of the 2G PAM module 150. As described herein, such a 2G module can utilize portions of the mid and low-band modules 140, 160 to route amplified 2G signals to respective antennas.

In the example of FIG. 2, the UHB PAiD module 190 can be configured to include amplification functionality for an ultra-high-band. Such an amplified signal can be output through a pin UHB_ANT and be routed to the first antenna 101.

In the example of FIG. 2, diversity receive (DRX) operations can be achieved through either or both of the first and second antennas 101, 102. Such DRX operations can be facilitated by a MB/HB/UHB MIMO DRx module 180 having MIMO functionality.

The module 180 is shown to include an input pin MLB_MB_HB_ANT which can be coupled to the first antenna 101 or the second antenna 102 through the switch 250. The module 180 is shown to further include output pins HODRX1 and HODRX2 that are coupled to corresponding pins DRX_UHB and DRX_MBHB. As the pin names indicate, the MIMO functionality can include processing of mid, high and ultra-high band received signals.

In the example of FIG. 2, DRX operations can also be achieved through the third and fourth antennas 103, 104. In some embodiments, such third and fourth antennas can be spatially separated from the first and second antennas 101, 102 to provide improved receive performance.

For example, a MB/HB/UHB MIMO module 200 that is separate from the foregoing module 180 can be provided near the third antenna 103, and be configured to receive mid-low, mid, and high-band signals through an input pin MLB_MB_HB_ANT, and receive an ultra-high-band signal through an input pin UHB_ANT. Such input signals can be processed by the module 200 and be output through corresponding output pins HODRX1 and HODRX2. Such output pins of the module 200 are shown to be coupled to routing pins HODRX1 and HODRX2, respectively, of a MLB/UHB/MB/HB DRX module 210 for routing of the signals to the relatively distant RFIC 110.

In the example of FIG. 2, the MLB/UHB/MB/HB DRX module 210 is shown to be provided near the fourth antenna 104, and be configured to receive mid-low, mid, and high-band signals through an input pin MLB_MB_HB_ANT, and receive an ultra-high-band signal through an input pin UHB_ANT. Such input signals can be processed by the module 210 and be output through appropriate ones of output pins UHB_DRX, HB1_DRX, HB2_DRX, MLB_MB1_DRX, and MB2_DRX. As described above, the outputs from the module 200 can be routed through the module 210. Accordingly, such outputs from the module 200 can also be output through appropriate ones of the foregoing output pins of the module 210.

In the example of FIG. 2, a LB DRX module 220 is shown to be provided near the fourth antenna 104, and be configured to receive a low-band signal through an input pin LB_ANT. Such an input signal can be processed by the module 220 and be output through an output pin LB2_DRX.

As described herein, the third and fourth antennas 103, 104 can be positioned relatively distant from the first and second antennas 101, 102. Assuming that the RFIC 110 is close to the first and second antennas 101, 102, the output signals from the DRX modules 200, 210 and 220 can be routed to the RFIC through a relatively long signal paths. More particularly, the five output pins of the module 210 are shown to be coupled to respective pins DRX_UHB, DRX_HB, DRX_HB, DRX_MB and DRX_MB on the RFIC 110 through such long signal paths. Similarly, the output pin of the module 220 is shown to be coupled to a respective pin DRX_LB on the RFIC through such a long signal path.

In the example of FIG. 2, the six long signal paths from the DRX modules 210 and 220 are depicted as including respective cross-device cables 261, 262, 263, 264, 265, 266.

Such cross-device cables can be lossy; however, because the received signals have already been processed by the DRX modules close to the respective antennas, such cross-device losses can be acceptable in view of the benefits obtained.

In the example of FIG. 2, the first antenna 101 can be configured to support mid, high and ultra-high band operations. Accordingly, the UHB PAiD module 190 as described herein is shown to be coupled to the first antenna 101 through a high-pass filter 252. The first antenna 101 is also shown to be capable of being coupled to each of the HB PAiD module 130, the MB PAiD module 140, the UL CA MB module 170a, and the MB/HB/UHB MIMO DRX module 180 through the switch 250 and a low-pass filter 254 for mid and high-band operations.

In the example of FIG. 2, the second antenna 102 can be configured to support low, mid-low, mid, high and ultra-high band operations. Accordingly, the LB PAiD module 160 as described herein is shown to be coupled to the second antenna 102 through a low-pass filter 258. The second antenna 102 is also shown to be capable of being coupled to each of the HB PAiD module 130, the MB PAiD module 140, the UL CA MB module 170a, and the MB/HB/UHB MIMO DRX module 180 through the switch 250 and a high-pass filter 256 for mid and high-band operations.

In the example of FIG. 2, the third antenna 103 can be configured to support mid, high and ultra-high bands, as well as GPS and WLAN operations. Accordingly, the DRX module 200 as described herein is shown to be coupled to the third antenna 103. More particularly, the UHB_ANT input pin of the DRX module 200 is shown to be coupled to the third antenna 103 through band-pass filters 270 and 272. Similarly, the MLB_MB_HB_ANT input pin of the DRX module 200 is shown to be coupled to the third antenna 103 through one of filters 274, 276 each having a plurality of pass bands.

In the example of FIG. 2, the fourth antenna 104 can be configured to support low, mid-low, mid, high and ultra-high bands, as well as WLAN operations. Accordingly, the DRX module 210 and 220 as described herein are shown to be coupled to the fourth antenna 104. More particularly, the UHB_ANT input pin of the DRX module 210 is shown to be coupled to the fourth antenna 104 through band-pass filters 280 and 286. Similarly, the MLB_MB_HB_ANT input pin of the DRX module 210 is shown to be coupled to the fourth antenna 104 through a band-pass filter 282 and one of filters 288, 290 each having a plurality of pass bands. Similarly, the LB_ANT input pin of the DRX module 220 is shown to be coupled to the fourth antenna 104 through a low-pass filter 284 and one of the filters 288, 290.

As described herein, the third example front-end architecture 100 of FIG. 2 is based on the example UL CA MB module 170a. FIG. 3 shows an example of the UL CA MB module 170a as being configured to provide TX/RX duplexing functionality for three bands A, B and C. It will be understood that some or all of such three bands can be selected to allow downlink (DL) carrier aggregation and/or uplink (UL) carrier aggregation through the module 170a.

In the example of FIG. 3, an envelope tracking (ET) power amplifier (PA) engine 300 is shown to be coupled to the previously described input pin MB_TX for receiving one or more transmit signals from the RFIC (110 in FIG. 2). The ET PA engine 300 is shown to include outputs for transmit portions (TX_A, TX_B, TX_C) of the three bands A, B and C. The TX_A output is shown to be coupled to a TX_A filter of a quadplexer (QPX_AB) 322, and the TX_B output is shown to be coupled to a TX_B filter of the same quadplexer (QPX_AB) 322. The TX_C output is shown to be coupled to a TX_C filter of a duplexer (DPX_C) 320.

Referring to FIG. 3, a common antenna path of the quadplexer 322 is shown to be coupled to the previously described (in reference to FIG. 2) antenna pin ANT through a band selection switch 324. Similarly, a common antenna path of the duplexer 320 is shown to be coupled to the antenna pin ANT through the band selection switch 324. Thus, if operation through the quadplexer 322 is desired, the switch 324 can be set accordingly (e.g., have a pole associated with the ANT pin be connected to a throw associated with the common antenna path of the quadplexer 322). Similarly, if operation through the duplexer 320 is desired, the switch 324 can be set accordingly (e.g., have the ANT pole be connected to a throw associated with the common antenna path of the duplexer 320).

In the example of FIG. 3, an LNA circuit is shown to be provided for each of the three bands A, B and C. More particularly, an LNA 315 is shown to be coupled to a RX_A filter of the quadplexer 322, an LNA 313 is shown to be coupled to a RX_B filter of the quadplexer 322, and an LNA 311 is shown to be coupled to a RX_C filter of the duplexer 320. As described above, the RX filters of the quadplexer 322 and the duplexer 320 can be coupled to the ANT pin through the band selection switch 324.

Referring to FIG. 3, an output of each of the LNAs 315, 313, 311 can be coupled to a respective node (e.g., a throw) of a switch 310 for appropriate routing to one of the previously described (in reference to FIG. 2) output pins MB1_RX and MB2_RX. As also described in reference to FIG. 2, routing input pins MB1_PRX and MB2_PRX (from the MB PAiD module 140) are coupled to the output pins MB1_RX and MB2_RX. FIG. 3 shows that such couplings can be achieved by the switch 310.

FIG. 3 shows that in some embodiments, each of the LNAs 315, 313, 311 can be configured as a variable-gain amplifier (VGA). Further, a switchable bypass path can be provided for each LNA. More particularly, a single-pole-single-throw (SPST) switch 316 can be implemented in parallel with the LNA 315 to provide a bypass path when the switch 316 is closed. Similarly, a SPST switch 314 can be implemented in parallel with the LNA 313 to provide a bypass path when the switch 314 is closed. Similarly, a SPST switch 312 can be implemented in parallel with the LNA 311 to provide a bypass path when the switch 312 is closed.

FIG. 3 also shows that in some embodiments, some or all of amplification and switching functionalities of the UL CA MB module 170a can be controlled by a control component such as a MIPI controller 302. Operation of such a controller can be facilitated by, for example, a control voltage VIO, a clock signal CLK, and control DATA.

FIG. 3 also shows that in some embodiments, a supply voltage VCC can be provided to the ET PA engine 300 for operation of one or more power amplifiers therein. On the output side of the ET PA engine 300, a power coupler circuit 326 can be provided to monitor the output power of the amplified signal. Such a coupler circuit can provide an output at a CPL_OUT pin to allow monitoring and adjustment to the operation of the ET PA engine 300 as needed.

FIG. 4 shows a more specific example of the UL CA MB module 170a of FIG. 3. FIG. 4 shows that in some embodiments, the first band (A) of FIG. 3 can be, for example, B3 band for FDD operation with a TX frequency range of 1,710 to 1,785 MHz and a RX frequency range of 1,805 to 1,880 MHz. Further, the second band (B) of FIG. 3 can be, for example, B1 band for FDD operation with a TX frequency range of 1,920 to 1,980 MHz and a RX frequency range of 2,110 to 2,170 MHz. Further, the third band (C) of FIG. 3 can be, for example, B2 band for FDD operation with a TX frequency range of 1,850 to 1,910 MHz and a RX frequency range of 1,930 to 1,990 MHz. It is noted that the first band (A) of FIG. 3 can also include B4 band for FDD operation with a TX frequency range of 1,710 to 1,755 MHz and a RX frequency range of 2,110 to 2,155 MHz, if utilized appropriately.

It will be understood that other specific frequency bands, including those disclosed herein, can be utilized for some or all of the first, second and third frequency bands A, B and C.

FIGS. 5-8 show examples of how the front-end architecture 100 of FIG. 2 can be configured to provide uplink (UL) and downlink (DL) carrier aggregation (CA) operations. Table 4 summarizes such UL and DL CA operations.

TABLE 4

| FIG. | Based on front-end architecture of: | UL functionality | DL functionality |
|---|---|---|---|
| 5 | FIG. 2 | LM | LMH |
| 6 | FIG. 2 | LH | LMH |
| 7 | FIG. 2 | MH | LMH |
| 8 | FIG. 2 | MM | LMH |

Figure 5:
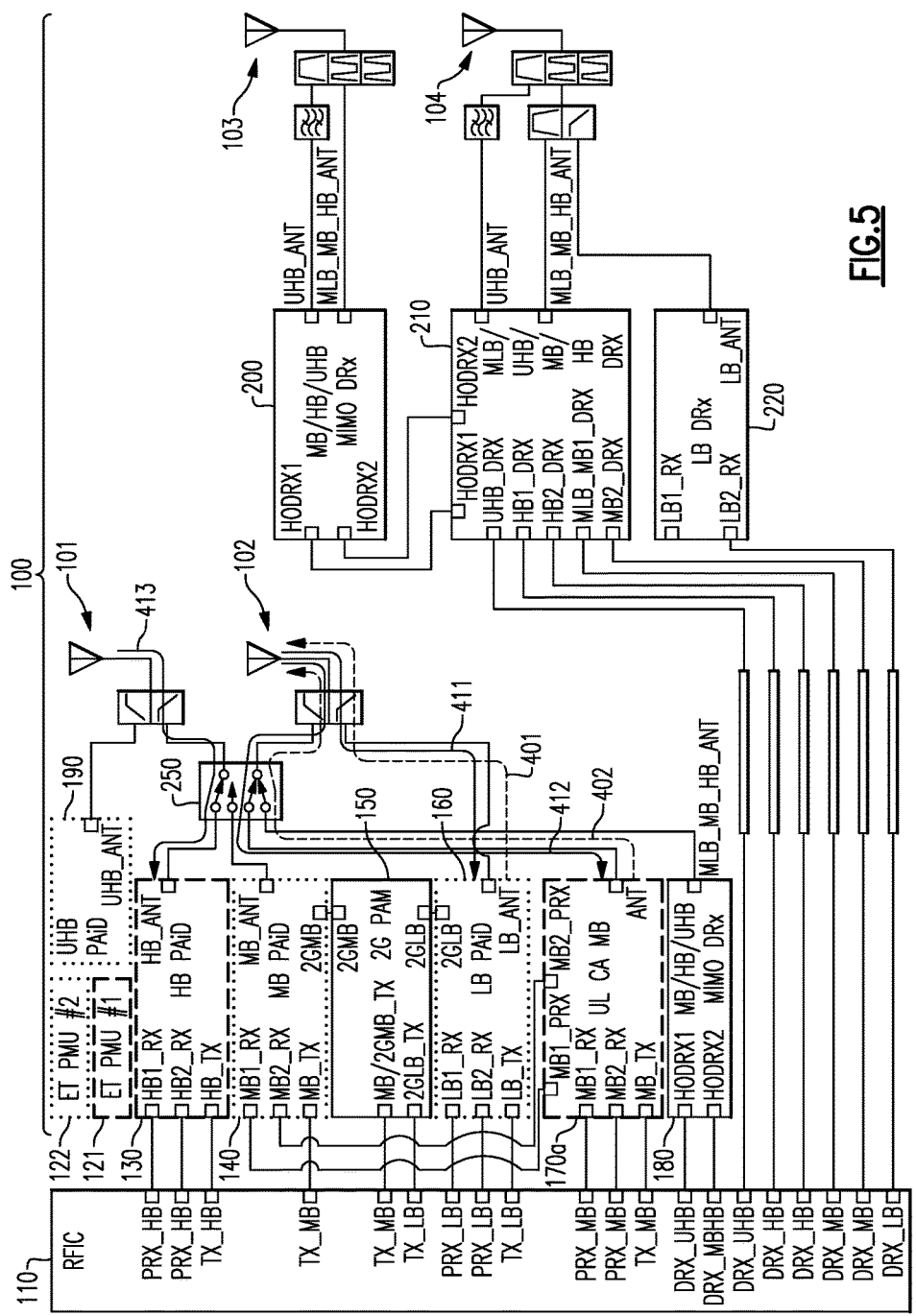
FIG. 5 shows an example of the front-end architecture of FIG. 2 being operated to provide uplink carrier aggregation in low-band and mid-band, and downlink carrier aggregation in low-band, mid-band, and high-band.

FIG. 5 shows an example in which the front-end architecture 100 of FIG. 2 is being operated to provide low and mid-band uplink carrier aggregation, and low, mid and high-band downlink carrier aggregation. For clarity, some of the reference numerals have been removed from FIG. 5; however, such parts correspond to the same in FIG. 2.

In FIG. 5, the low-band transmit operation is shown to be achieved by the LB PAiD module 160 and the second antenna 102, through a signal path indicated as 401. The mid-band transmit operation is shown to be achieved by the UL CA MB module 170a and the second antenna 102, through a signal path indicated as 402.

In FIG. 5, the low-band receive operation is shown to be achieved by the second antenna 102 and the LB PAiD module 160, through a signal path indicated as 411. The mid-band receive operation is shown to be achieved by the second antenna 102 and the UL CA MB module 170a, through a signal path indicated as 412. The high-band receive operation is shown to be achieved by the first antenna 101 and the HB PAiD module 130, through a signal path indicated as 413.

Figure 6:
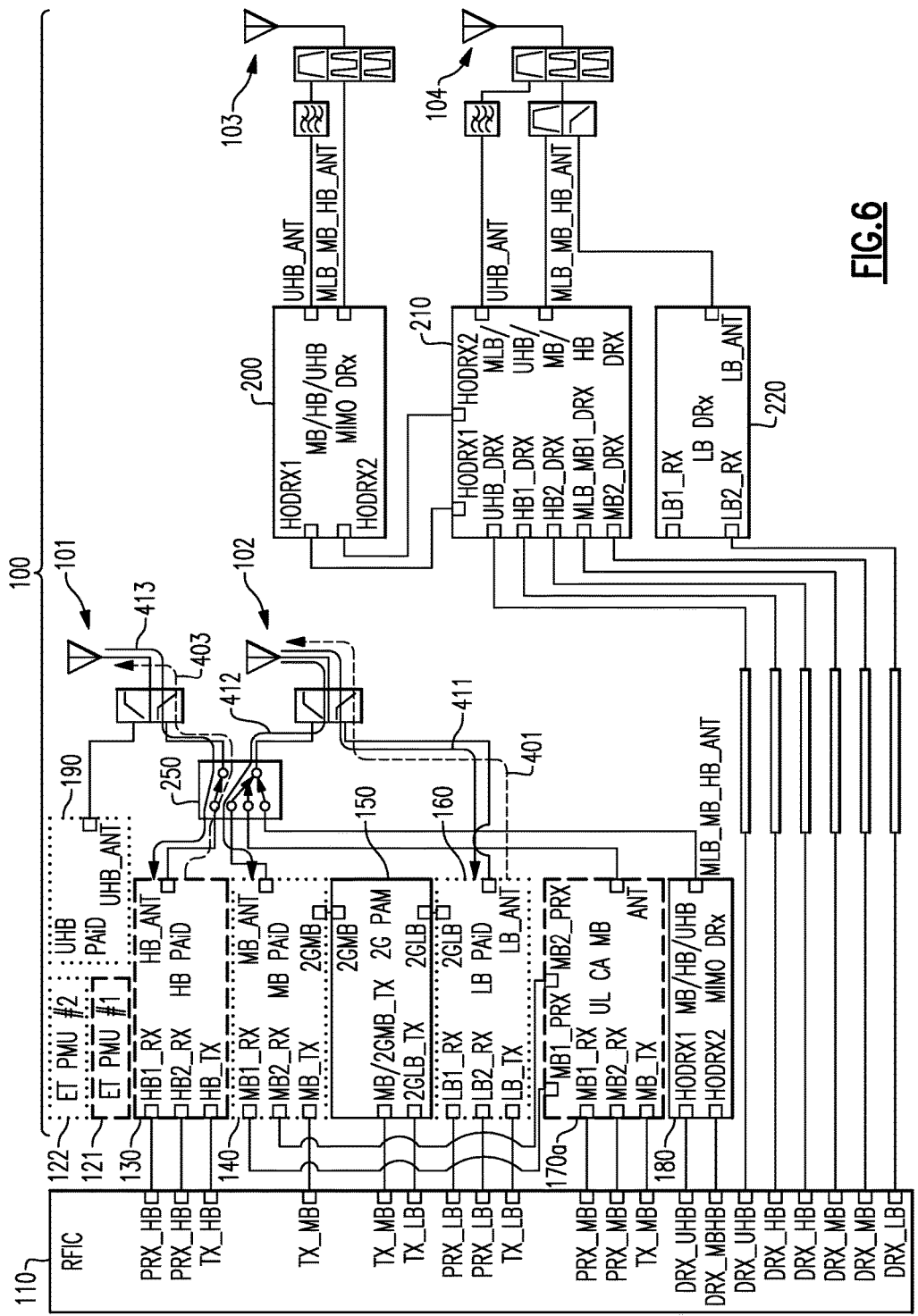
FIG. 6 shows an example of the front-end architecture of FIG. 2 being operated to provide uplink carrier aggregation in low-band and high-band, and downlink carrier aggregation in low-band, mid-band, and high-band.

FIG. 6 shows an example in which the front-end architecture 100 of FIG. 2 is being operated to provide low and high-band uplink carrier aggregation, and low, mid and high-band downlink carrier aggregation. For clarity, some of the reference numerals have been removed from FIG. 6; however, such parts correspond to the same in FIG. 2.

In FIG. 6, the low-band transmit operation is shown to be achieved by the LB PAiD module 160 and the second antenna 102, through a signal path indicated as 401. The high-band transmit operation is shown to be achieved by the HB PAiD module 130 and the first antenna 101, through a signal path indicated as 403.

In FIG. 6, the low-band receive operation is shown to be achieved by the second antenna 102 and the LB PAiD module 160, through a signal path indicated as 411. The mid-band receive operation is shown to be achieved by the second antenna 102 and the MB PAiD module 140, through a signal path indicated as 412. The high-band receive operation is shown to be achieved by the first antenna 101 and the HB PAiD module 130, through a signal path indicated as 413.

Figure 7:
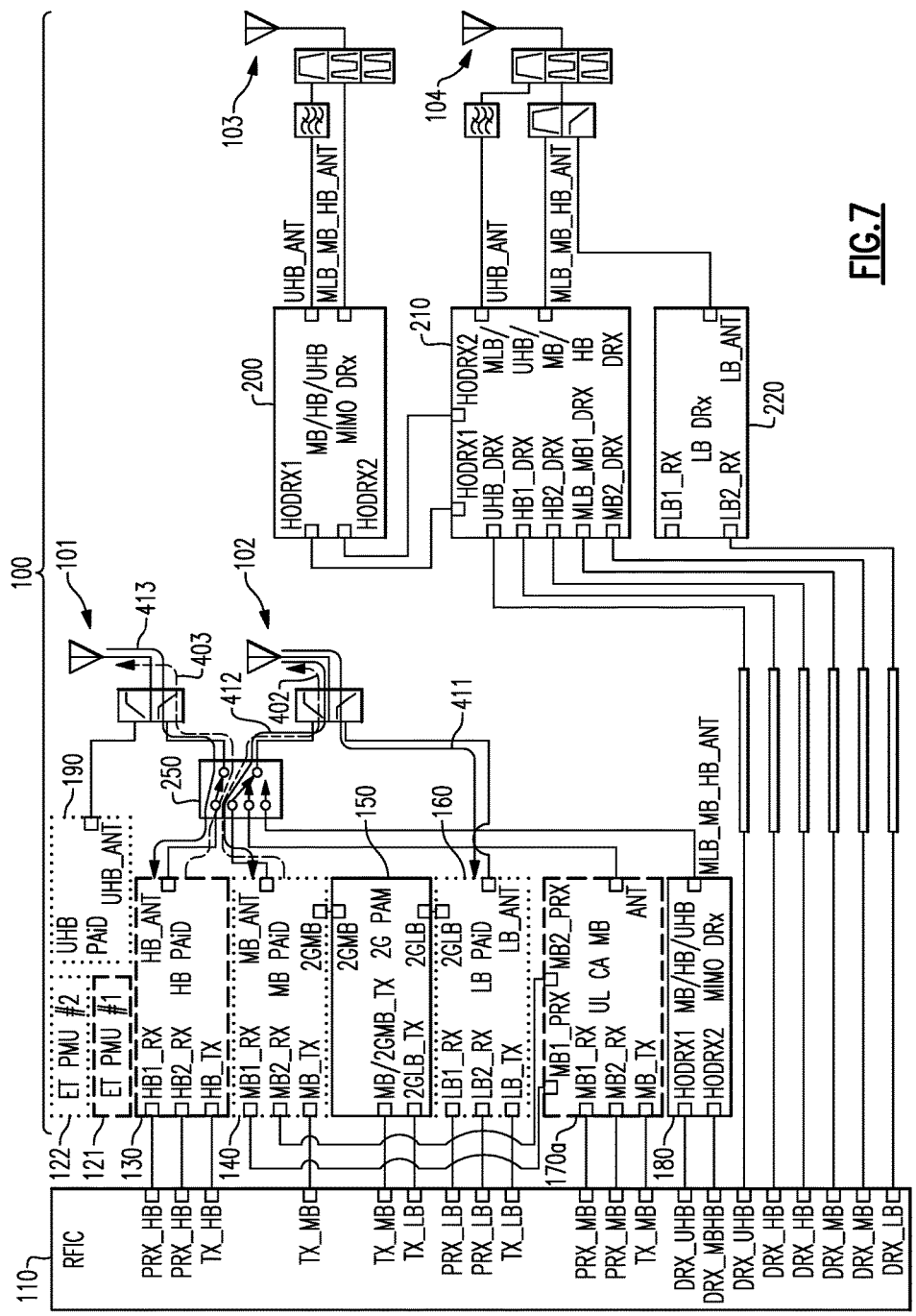
FIG. 7 shows an example of the front-end architecture of FIG. 2 being operated to provide uplink carrier aggregation in mid-band and high-band, and downlink carrier aggregation in low-band, mid-band, and high-band.

FIG. 7 shows an example in which the front-end architecture 100 of FIG. 2 is being operated to provide mid and high-band uplink carrier aggregation, and low, mid and high-band downlink carrier aggregation. For clarity, some of the reference numerals have been removed from FIG. 7; however, such parts correspond to the same in FIG. 2.

In FIG. 7, the mid-band transmit operation is shown to be achieved by the MB PAiD module 140 and the second antenna 102, through a signal path indicated as 402. The high-band transmit operation is shown to be achieved by the HB PAiD module 130 and the first antenna 101, through a signal path indicated as 403.

In FIG. 7, the low-band receive operation is shown to be achieved by the second antenna 102 and the LB PAiD module 160, through a signal path indicated as 411. The mid-band receive operation is shown to be achieved by the second antenna 102 and the MB PAiD module 140, through a signal path indicated as 412. The high-band receive operation is shown to be achieved by the first antenna 101 and the HB PAiD module 130, through a signal path indicated as 413.

Figure 8:
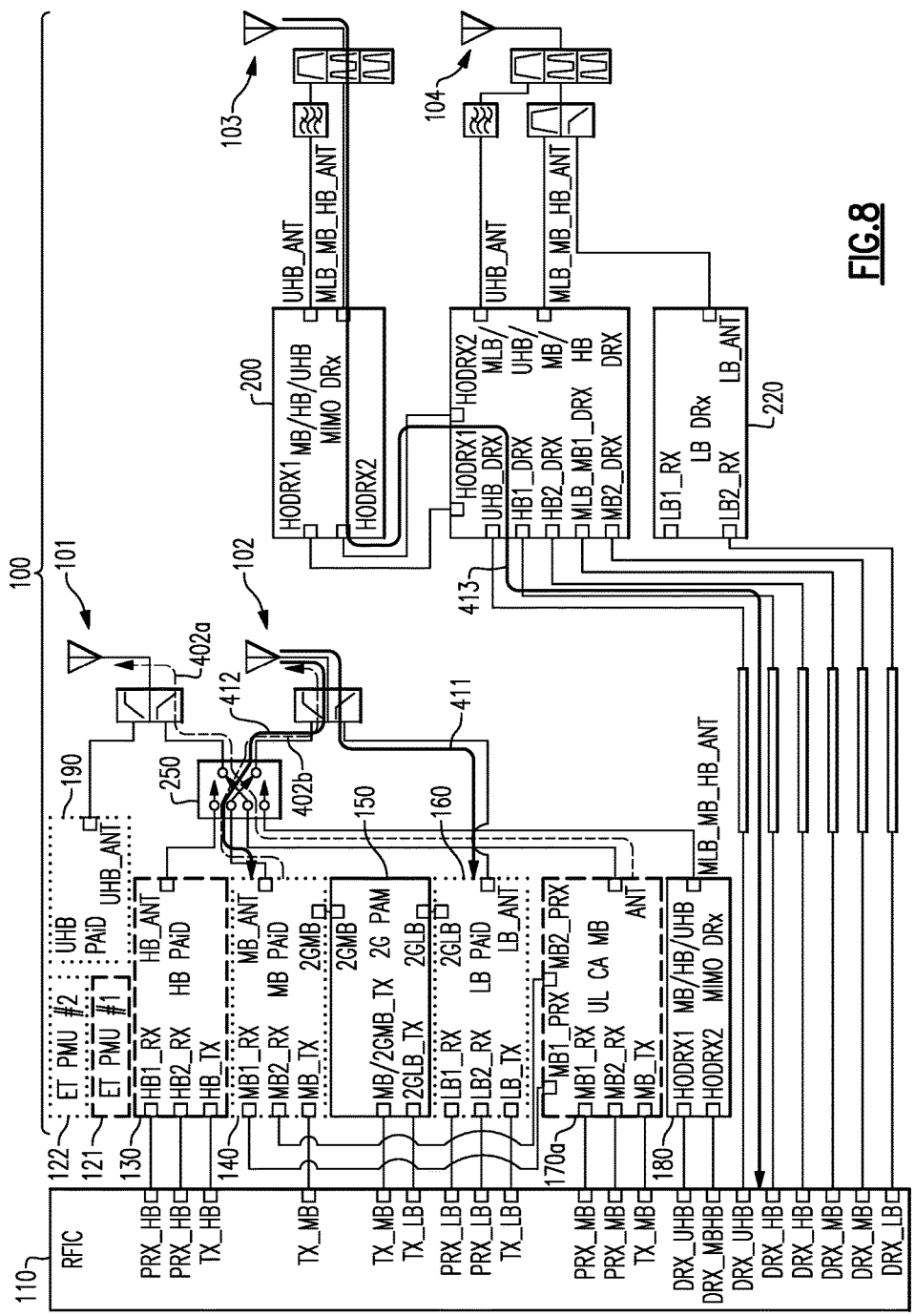
FIG. 8 shows an example of the front-end architecture of FIG. 2 being operated to provide uplink carrier aggregation in two mid-bands, and downlink carrier aggregation in low-band, mid-band, and high-band.

FIG. 8 shows an example in which the front-end architecture 100 of FIG. 2 is being operated to provide two mid-band uplink carrier aggregation, and low, mid and high-band downlink carrier aggregation. For clarity, some of the reference numerals have been removed from FIG. 8; however, such parts correspond to the same in FIG. 2.

In FIG. 8, the first mid-band transmit operation is shown to be achieved by the UL CA MB module 170a and the first antenna 101, through a signal path indicated as 402a. The second mid-band transmit operation is shown to be achieved by the MB PAiD module 140 and the second antenna 102, through a signal path indicated as 402b.

In FIG. 8, the low-band receive operation is shown to be achieved by the second antenna 102 and the LB PAiD module 160, through a signal path indicated as 411. The mid-band receive operation is shown to be achieved by the second antenna 102 and the MB PAiD module 140, through a signal path indicated as 412. The high-band receive operation is shown to be achieved by the third antenna 103 and the DRX module 200, through a signal path indicated as 413.

Example 4 of Front-End Architecture

FIG. 9 shows a fourth example front-end architecture 100 that can be implemented to provide various transmit (TX) and receive (RX) functionalities with a radio-frequency integrated circuit (RFIC) 110 and multiple antennas. For the purpose of description, the fourth example front-end architecture 100 of FIG. 9 is generally the same as the third example front-end architecture 100 of FIG. 2, other than a different UL CA MB module 170b (in FIG. 9), as well as its connectivity configuration with respect to the MB PAiD module 140 (in both of FIGS. 2 and 9). Accordingly, details concerning similar parts are described herein in reference to FIG. 2.

In the example of FIG. 9, the RX connectivity between the MB PAiD module 140 and the RFIC 110 is shown to be direct, and without being routed through the UC CA MB module 170b. Thus, the output pins MB1_RX and MB2_RX are shown to be coupled to the corresponding pins PRX_MB without being routed through another module.

Accordingly, in the example of FIG. 9, the UL CA MB module 170b does not have the routing pins (MB1_PRX and MB2_PRX in FIG. 2). Further, the UL CA MB module 170b in FIG. 9 is shown to not have any RX output pins (MB1_RX and MB2_RX in FIG. 2). Such absence of RX output pins is because in some embodiments, the UL CA MB module 170b can be configured to provide only transmit functionality without any receive functionality.

Figure 10:
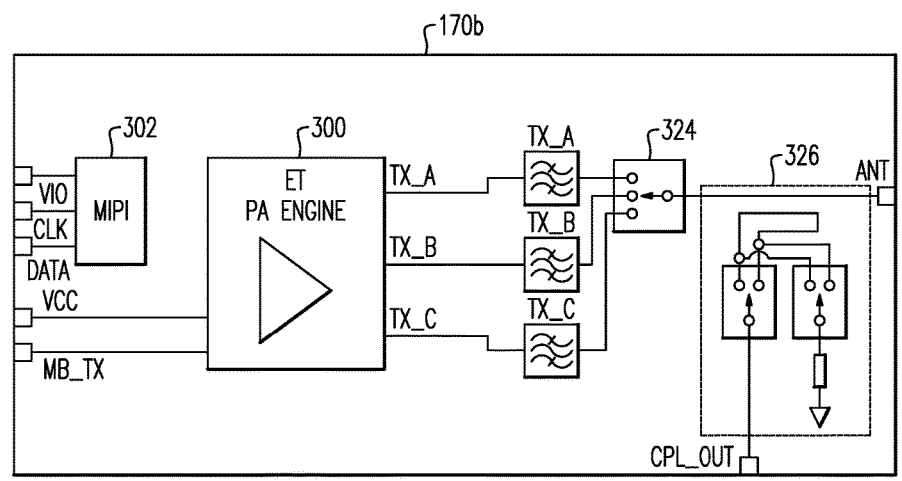
FIG. 10 shows an example of the second mid-band uplink carrier aggregation component of FIG. 9.

FIG. 10 shows an example of the UL CA MB module 170b as being configured to provide transmit functionality for three bands A, B and C, and no receive functionality. It will be understood that some or all of such three bands can be selected to allow uplink (UL) carrier aggregation through the module 170b.

For the purpose of description, the example UL CA MB module 170b is similar to the transmit portion of the example UL CA MB module 170a of FIG. 3. Accordingly, details concerning similar parts are described herein in reference to FIG. 3.

Figure 11:
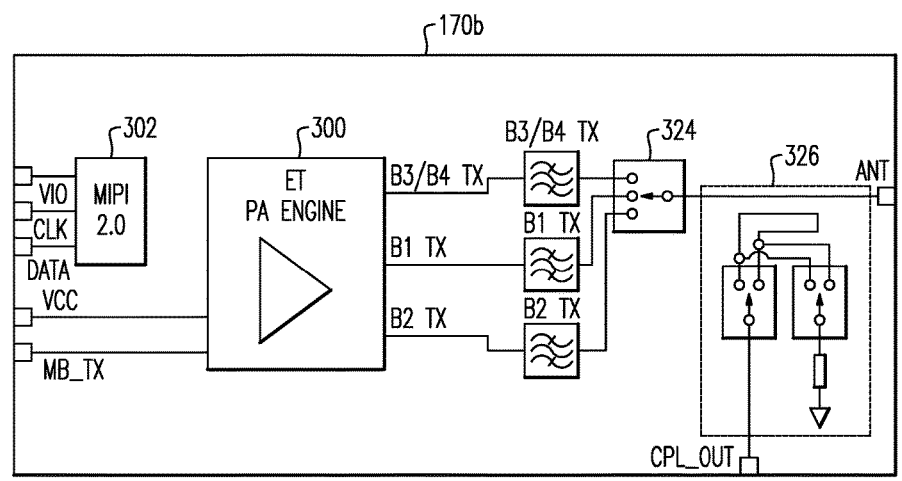
FIG. 11 shows a more specific example of the second mid-band uplink carrier aggregation component of FIG. 10.

FIG. 11 shows a more specific example of the UL CA MB module 170b of FIG. 10, in the context of the specific example bands B3/B4, B1 and B2 (transmit portions) described in reference to FIG. 4. Accordingly, it will be understood that other specific frequency bands, including those disclosed herein, can be utilized for some or all of the first, second and third frequency bands A, B and C of FIG. 10.

FIGS. 12-15 show examples of how the front-end architecture 100 of FIG. 9 can be configured to provide uplink (UL) and downlink (DL) carrier aggregation (CA) operations. Table 5 summarizes such UL and DL CA operations.

TABLE 5

| FIG. | Based on front-end architecture of: | UL functionality | DL functionality |
|---|---|---|---|
| 12 | FIG. 9 | LM | LMH |
| 13 | FIG. 9 | LH | LMH |
| 14 | FIG. 9 | MH | LMH |
| 15 | FIG. 9 | MM | LMH |

Figure 12:
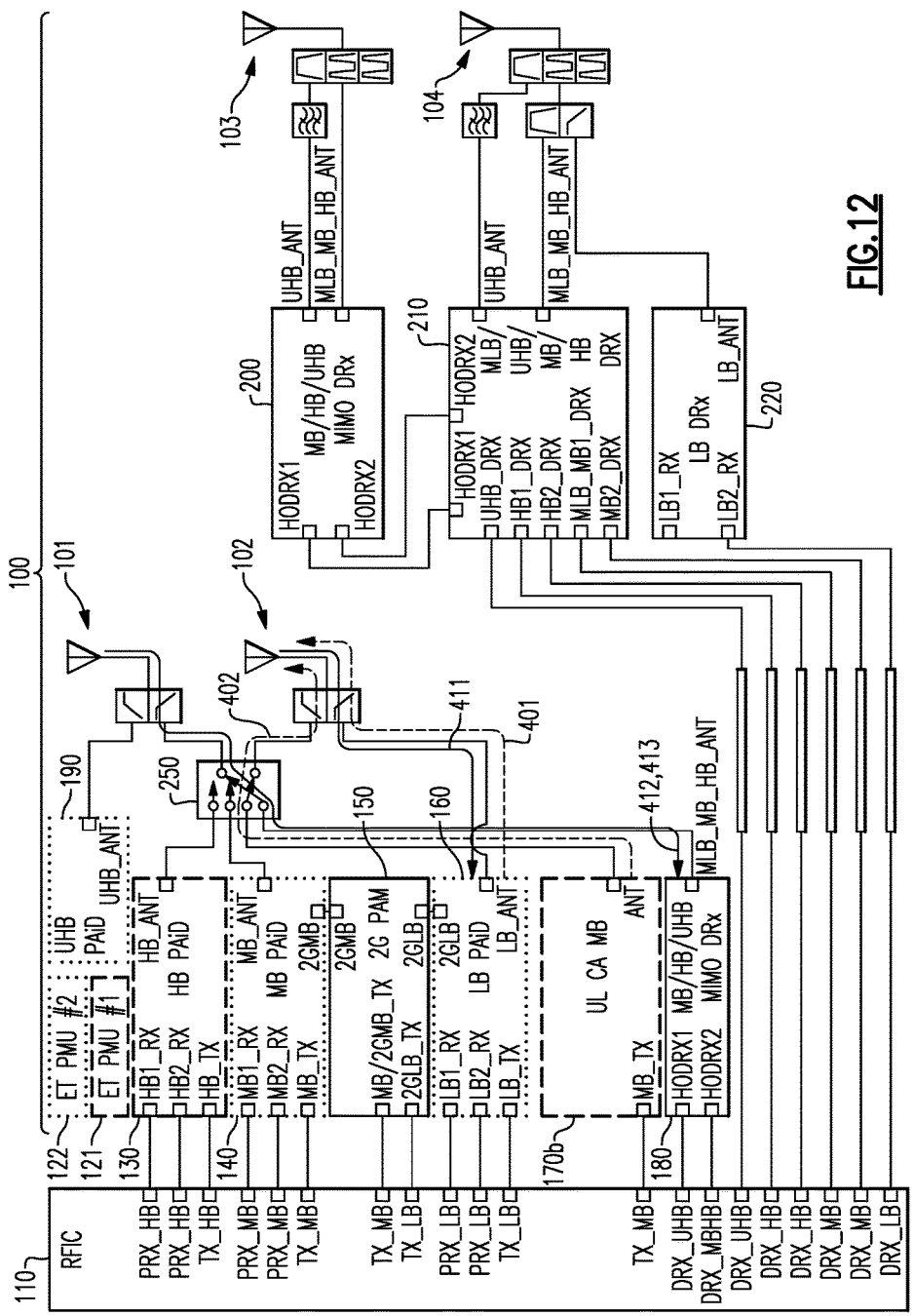
FIG. 12 shows an example of the front-end architecture of FIG. 9 being operated to provide uplink carrier aggregation in low-band and mid-band, and downlink carrier aggregation in low-band, mid-band, and high-band.

FIG. 12 shows an example in which the front-end architecture 100 of FIG. 9 is being operated to provide low and mid-band uplink carrier aggregation, and low, mid and high-band downlink carrier aggregation. For clarity, some of the reference numerals have been removed from FIG. 12; however, such parts correspond to the same in FIG. 9.

In FIG. 12, the low-band transmit operation is shown to be achieved by the LB PAiD module 160 and the second antenna 102, through a signal path indicated as 401. The mid-band transmit operation is shown to be achieved by the UL CA MB module 170b and the second antenna 102, through a signal path indicated as 402.

In FIG. 12, the low-band receive operation is shown to be achieved by the second antenna 102 and the LB PAiD module 160, through a signal path indicated as 411. The mid-band and high-band receive operations are shown to be achieved by the first antenna 101 and the DRX module 180, through a signal path indicated as 412, 413.

Figure 13:
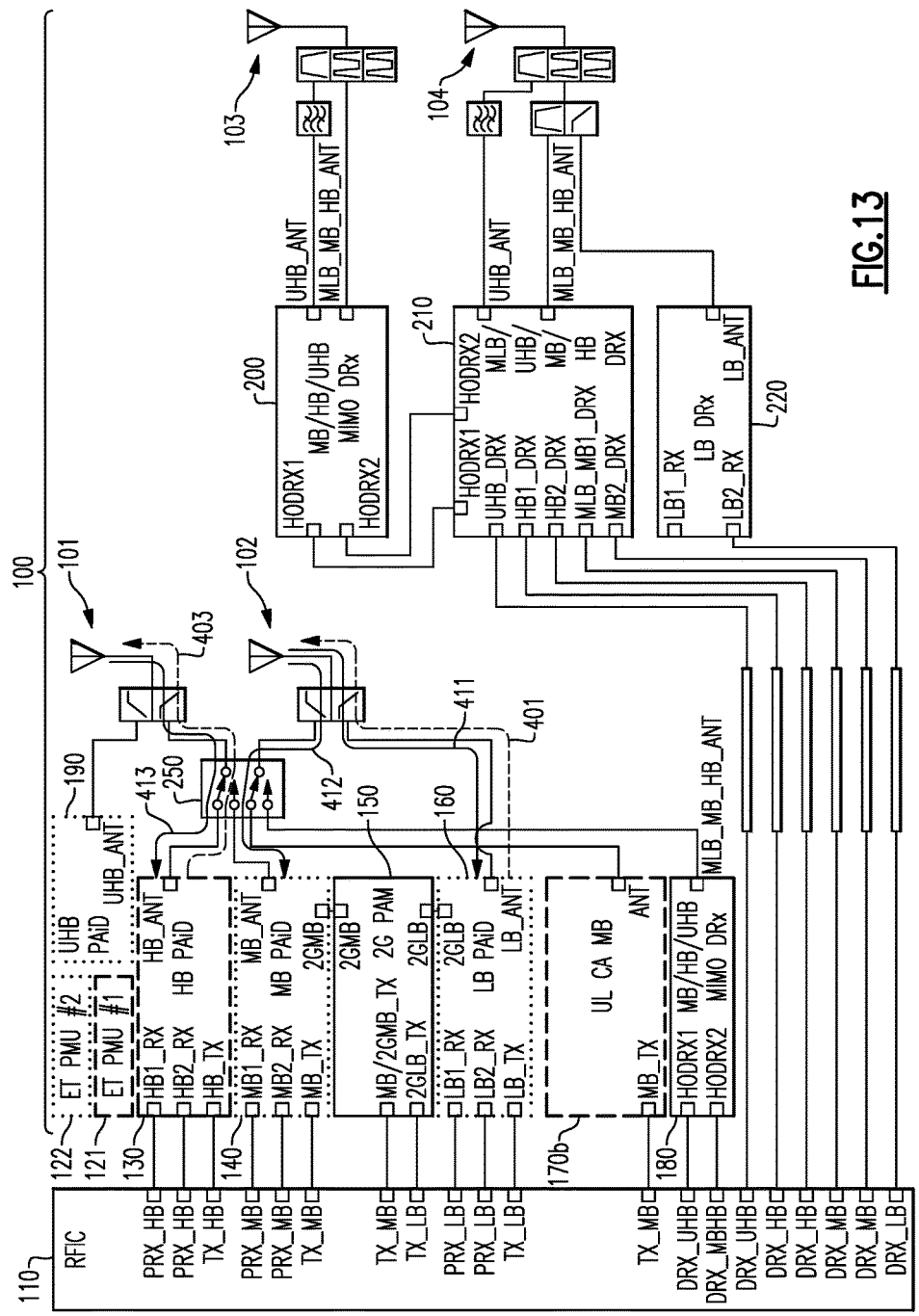
FIG. 13 shows an example of the front-end architecture of FIG. 9 being operated to provide uplink carrier aggregation in low-band and high-band, and downlink carrier aggregation in low-band, mid-band, and high-band.

FIG. 13 shows an example in which the front-end architecture 100 of FIG. 9 is being operated to provide low and high-band uplink carrier aggregation, and low, mid and high-band downlink carrier aggregation. For clarity, some of the reference numerals have been removed from FIG. 13; however, such parts correspond to the same in FIG. 9.

In FIG. 13, the low-band transmit operation is shown to be achieved by the LB PAiD module 160 and the second antenna 102, through a signal path indicated as 401. The high-band transmit operation is shown to be achieved by the HB PAiD module 130 and the first antenna 101, through a signal path indicated as 403.

In FIG. 13, the low-band receive operation is shown to be achieved by the second antenna 102 and the LB PAiD module 160, through a signal path indicated as 411. The mid-band receive operation is shown to be achieved by the second antenna 102 and the MB PAiD module 140, through a signal path indicated as 412. The high-band receive operation is shown to be achieved by the first antenna 101 and the HB PAiD module 130, through a signal path indicated as 413.

Figure 14:
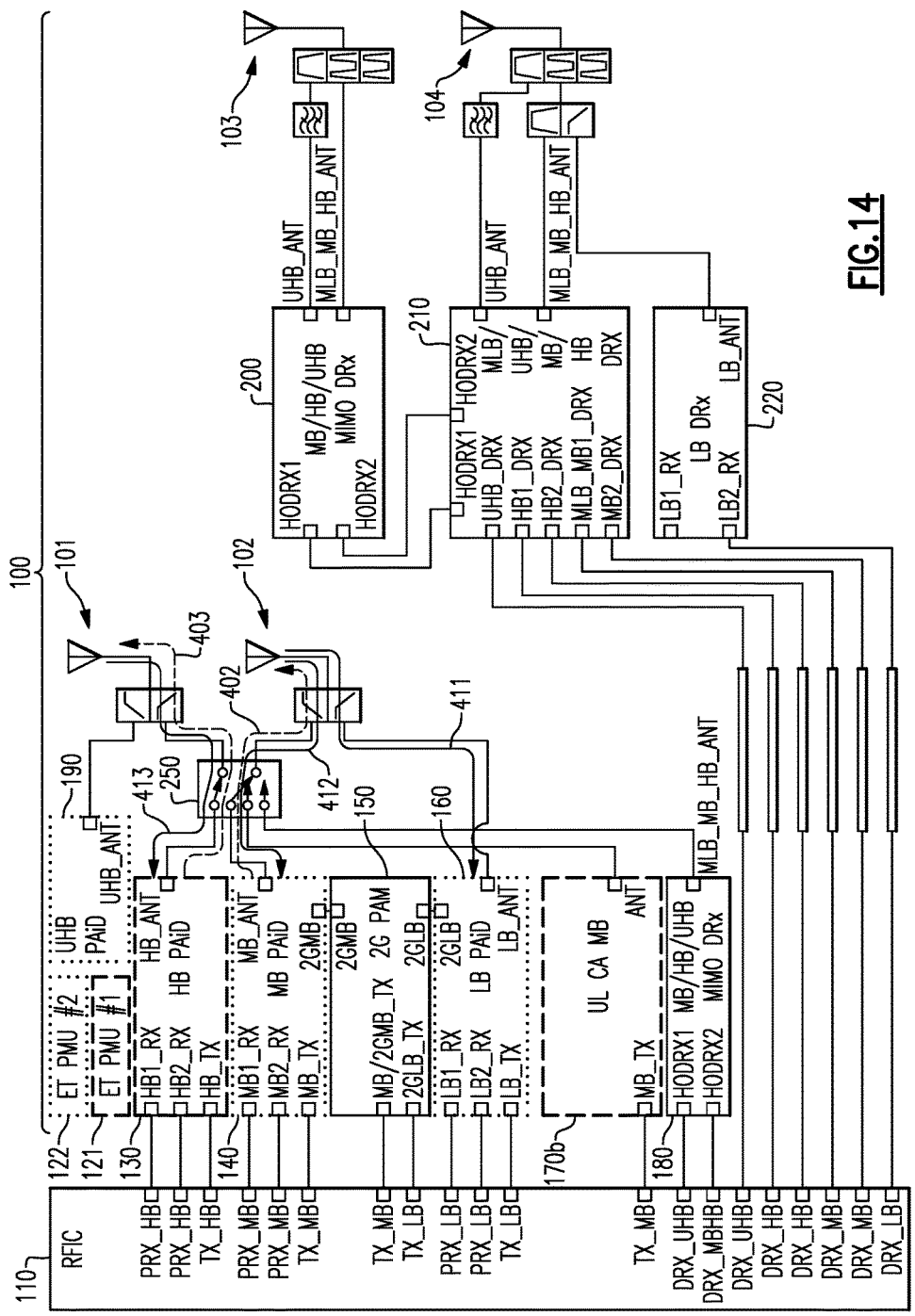
FIG. 14 shows an example of the front-end architecture of FIG. 9 being operated to provide uplink carrier aggregation in mid-band and high-band, and downlink carrier aggregation in low-band, mid-band, and high-band.

FIG. 14 shows an example in which the front-end architecture 100 of FIG. 9 is being operated to provide mid and high-band uplink carrier aggregation, and low, mid and high-band downlink carrier aggregation. For clarity, some of the reference numerals have been removed from FIG. 14; however, such parts correspond to the same in FIG. 9.

In FIG. 14, the mid-band transmit operation is shown to be achieved by the MB PAiD module 140 and the second antenna 102, through a signal path indicated as 402. The high-band transmit operation is shown to be achieved by the HB PAiD module 130 and the first antenna 101, through a signal path indicated as 403.

In FIG. 14, the low-band receive operation is shown to be achieved by the second antenna 102 and the LB PAiD module 160, through a signal path indicated as 411. The mid-band receive operation is shown to be achieved by the second antenna 102 and the MB PAiD module 140, through a signal path indicated as 412. The high-band receive operation is shown to be achieved by the first antenna 101 and the HB PAiD module 130, through a signal path indicated as 413.

Figure 15:
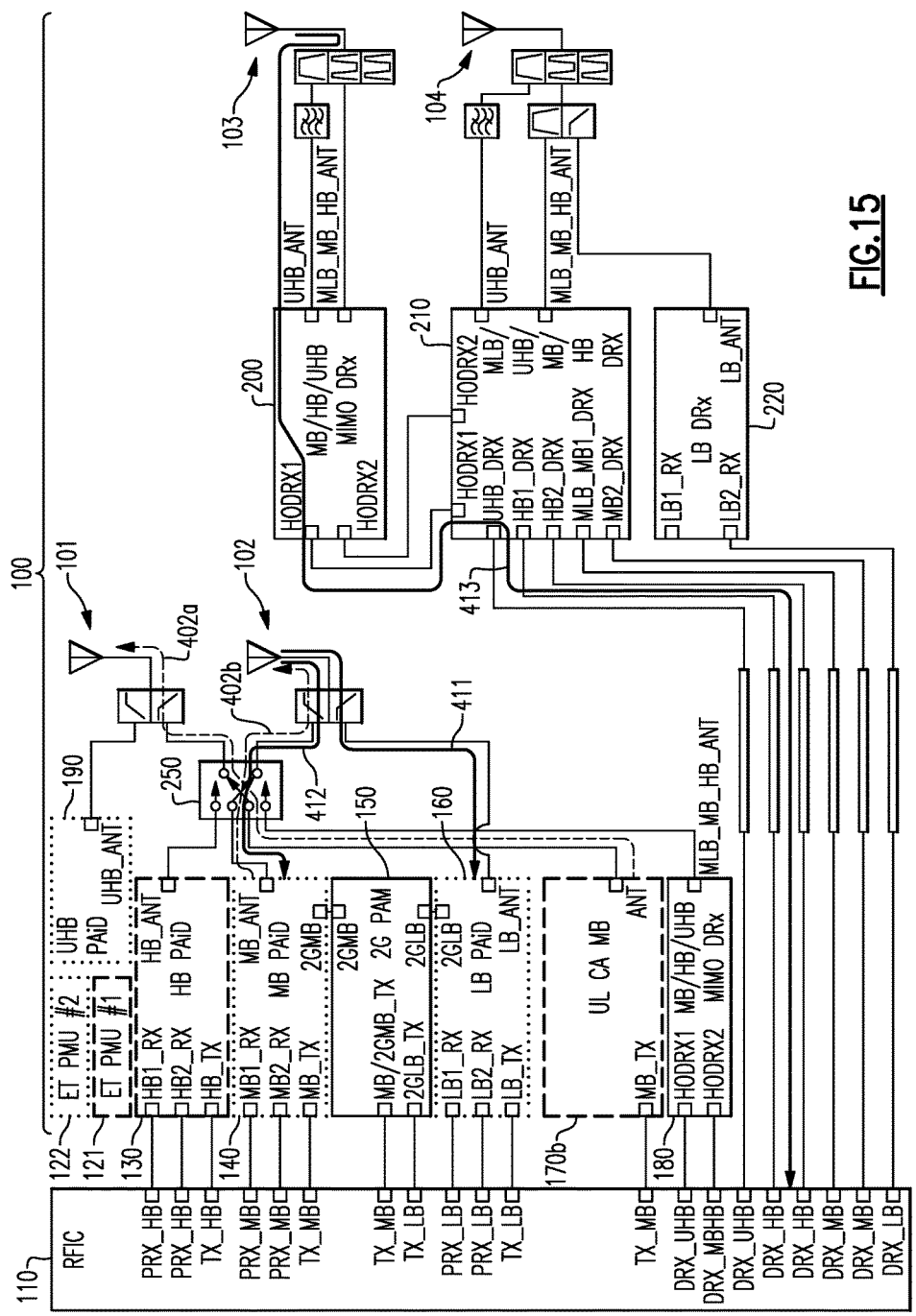
FIG. 15 shows an example of the front-end architecture of FIG. 9 being operated to provide uplink carrier aggregation in two mid-bands, and downlink carrier aggregation in low-band, mid-band, and high-band.

FIG. 15 shows an example in which the front-end architecture 100 of FIG. 9 is being operated to provide two mid-band uplink carrier aggregation, and low, mid and high-band downlink carrier aggregation. For clarity, some of the reference numerals have been removed from FIG. 15; however, such parts correspond to the same in FIG. 9.

In FIG. 15, the first mid-band transmit operation is shown to be achieved by the UL CA MB module 170b and the first antenna 101, through a signal path indicated as 402a. The second mid-band transmit operation is shown to be achieved by the MB PAiD module 140 and the second antenna 102, through a signal path indicated as 402b.

In FIG. 15, the low-band receive operation is shown to be achieved by the second antenna 102 and the LB PAiD module 160, through a signal path indicated as 411. The mid-band receive operation is shown to be achieved by the second antenna 102 and the MB PAiD module 140, through a signal path indicated as 412. The high-band receive operation is shown to be achieved by the third antenna 103 and the DRX module 200, through a signal path indicated as 413.

Example 5 of Front-End Architecture

FIG. 16 shows a fifth example front-end architecture 100 that can be implemented to provide various transmit (TX) and receive (RX) functionalities with a radio-frequency integrated circuit (RFIC) 110 and multiple antennas. For the purpose of description, the fifth example front-end architecture 100 of FIG. 16 is generally the same as the third example front-end architecture 100 of FIG. 2, other than a different UL CA MB module 170c (in FIG. 16), its connectivity configuration with respect to the MB PAiD module 140 (in both of FIGS. 2 and 16), and the implementation of the two independent PMUs 121, 122. Accordingly, details concerning similar parts are described herein in reference to FIG. 2.

In the example of FIG. 16, the RX connectivity between the MB PAiD module 140 and the RFIC 110 is shown to be direct, and without being routed through the UC CA MB module 170c. Thus, the output pins MB1_RX and MB2_RX are shown to be coupled to the corresponding pins PRX_MB without being routed through another module.

Accordingly, in the example of FIG. 16, the UL CA MB module 170c does not have the routing pins (MB1_PRX and MB2_PRX in FIG. 2). Further, the UL CA MB module 170c in FIG. 16 is shown to not have any RX output pins (MB1_RX and MB2_RX in FIG. 2). Such absence of RX output pins is because in some embodiments, the UL CA MB module 170c can be configured to provide only transmit functionality without any receive functionality.

In the example of FIG. 16, the front-end architecture 100 is shown to include two separate PMUs, similar to the example of FIG. 2. However, the first PMU 121 of FIG. 16, indicated by a dashed box, is configured to supply power amplifiers in APT operations, including APT HV operations. For example, a LB PAiD module or component 160 (also indicated by a dashed box) can be provided with APT HV supply voltage from the first PMU 121 for one or more power amplifiers therein for low-band operations. In another example, an UL CA MB module or component 170c (also indicated by a dashed box) can be provided with APT HV supply voltage from the first PMU 121 for one or more power amplifiers therein for mid-band operations.

The second PMU 122 is indicated by a dotted box, and is configured to supply power amplifiers in ET operations. For example, an UHB PAiD module or component 190 (also indicated by a dotted box) can be provided with ET supply voltage from the second PMU 122 for one or more power amplifiers therein for ultra-high-band operations. In another example, a MB PAiD module or component 140 (also indicated by a dotted box) can be provided with ET supply voltage from the second PMU 122 for one or more power amplifiers therein for mid-band operations. In yet another example, a HB PAiD module or component 130 (also indicated by a dotted box) can be provided with ET supply voltage from the second PMU 122 for one or more power amplifiers therein for high-band operations.

Figure 17:
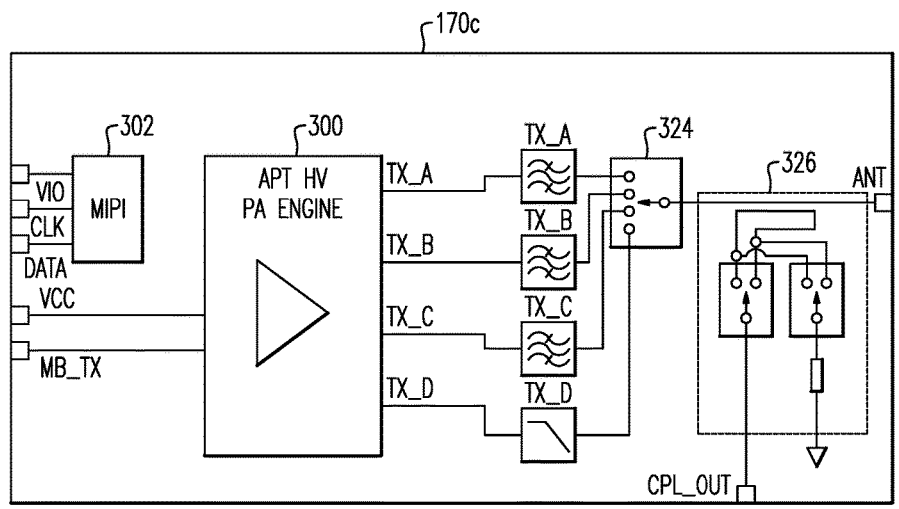
FIG. 17 shows an example of the third mid-band uplink carrier aggregation component of FIG. 16.

FIG. 17 shows an example of the UL CA MB module 170c of FIG. 16 as being configured to provide transmit functionality for three bands A, B and C, and no receive functionality. It will be understood that some or all of such three bands can be selected to allow uplink (UL) carrier aggregation through the module 170c.

For the purpose of description, the example UL CA MB module 170c of FIG. 17 is similar to the example UL CA MB module 170b of FIG. 10. Accordingly, details concerning similar parts are described herein in reference to FIG. 10. In the example of FIG. 17, however, the PA engine 300 is shown to be configured to operate with the APT HV supply (from the first PMU 121 in FIG. 16). Further, a fourth transmit band (D) is shown to be included for amplification by the PA engine 300. Such an amplified signal in the fourth transmit band D is shown to be filtered by a low-pass filter (TX_D) and be routed to the antenna pin ANT through a band-selection switch 324 (having an extra throw for the TX_D signal path).

Figure 18:
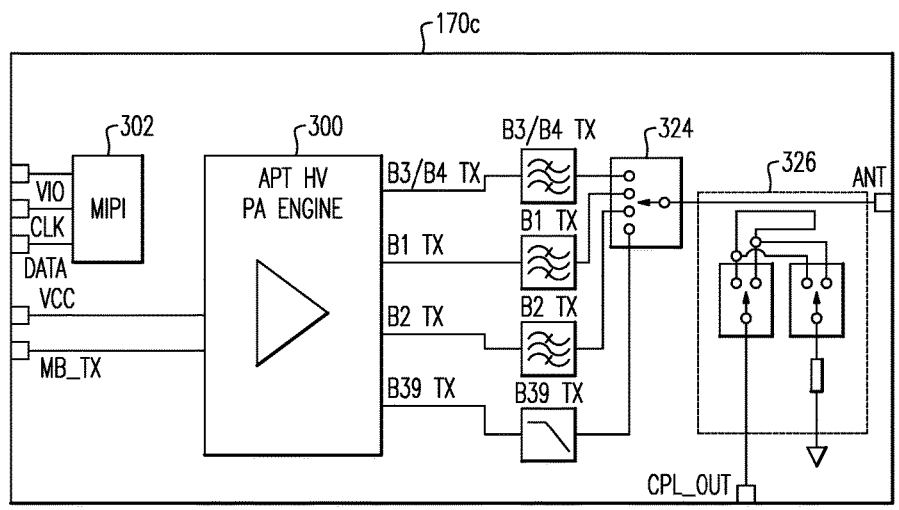
FIG. 18 shows a more specific example of the third mid-band uplink carrier aggregation component of FIG. 17.

FIG. 18 shows a more specific example of the UL CA MB module 170c of FIG. 17, in the context of the specific example bands B3/B4, B1 and B2 (transmit portions) described in reference to FIG. 4. Further, in the example of FIG. 18, the fourth band D of FIG. 17 can be, B39 transmit portion with a TX frequency range of 1,880 to 1,920 MHz. Accordingly, it will be understood that other specific frequency bands, including those disclosed herein, can be utilized for some or all of the first, second, third and fourth frequency bands A, B, C and D of FIG. 17.

FIGS. 19-22 show examples of how the front-end architecture 100 of FIG. 16 can be configured to provide uplink (UL) and downlink (DL) carrier aggregation (CA) operations. Table 6 summarizes such UL and DL CA operations.

TABLE 6

| FIG. | Based on front-end architecture of: | UL functionality | DL functionality |
|---|---|---|---|
| 19 | FIG. 16 | LM | LMH |
| 20 | FIG. 16 | LH | LMH |
| 21 | FIG. 16 | MH | LMH |
| 22 | FIG. 16 | MM | LMH |

Figure 19:
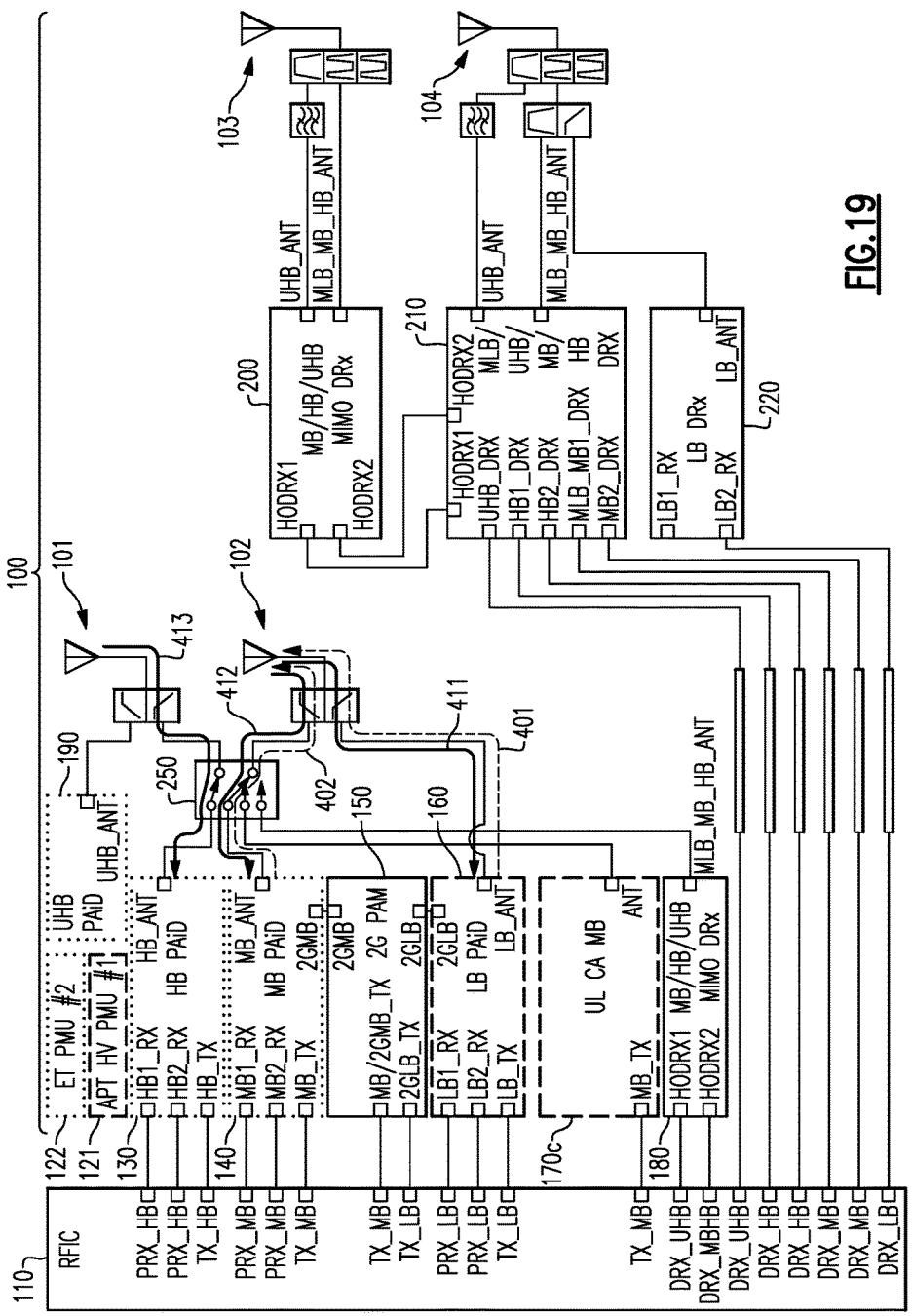
FIG. 19 shows an example of the front-end architecture of FIG. 16 being operated to provide uplink carrier aggregation in low-band and mid-band, and downlink carrier aggregation in low-band, mid-band, and high-band.

FIG. 19 shows an example in which the front-end architecture 100 of FIG. 16 is being operated to provide low and mid-band uplink carrier aggregation, and low, mid and high-band downlink carrier aggregation. For clarity, some of the reference numerals have been removed from FIG. 19; however, such parts correspond to the same in FIG. 16.

In FIG. 19, the low-band transmit operation is shown to be achieved by the LB PAiD module 160 and the second antenna 102, through a signal path indicated as 401. The mid-band transmit operation is shown to be achieved by the MB PAiD module 140 and the second antenna 102, through a signal path indicated as 402.

In FIG. 19, the low-band receive operation is shown to be achieved by the second antenna 102 and the LB PAiD module 160, through a signal path indicated as 411. The mid-band receive operation is shown to be achieved by the second antenna 102 and the MB PAiD module 140, through a signal path indicated as 412. The high-band receive operation is shown to be achieved by the first antenna 101 and the HB PAiD module 130, through a signal path indicated as 413.

Figure 20:
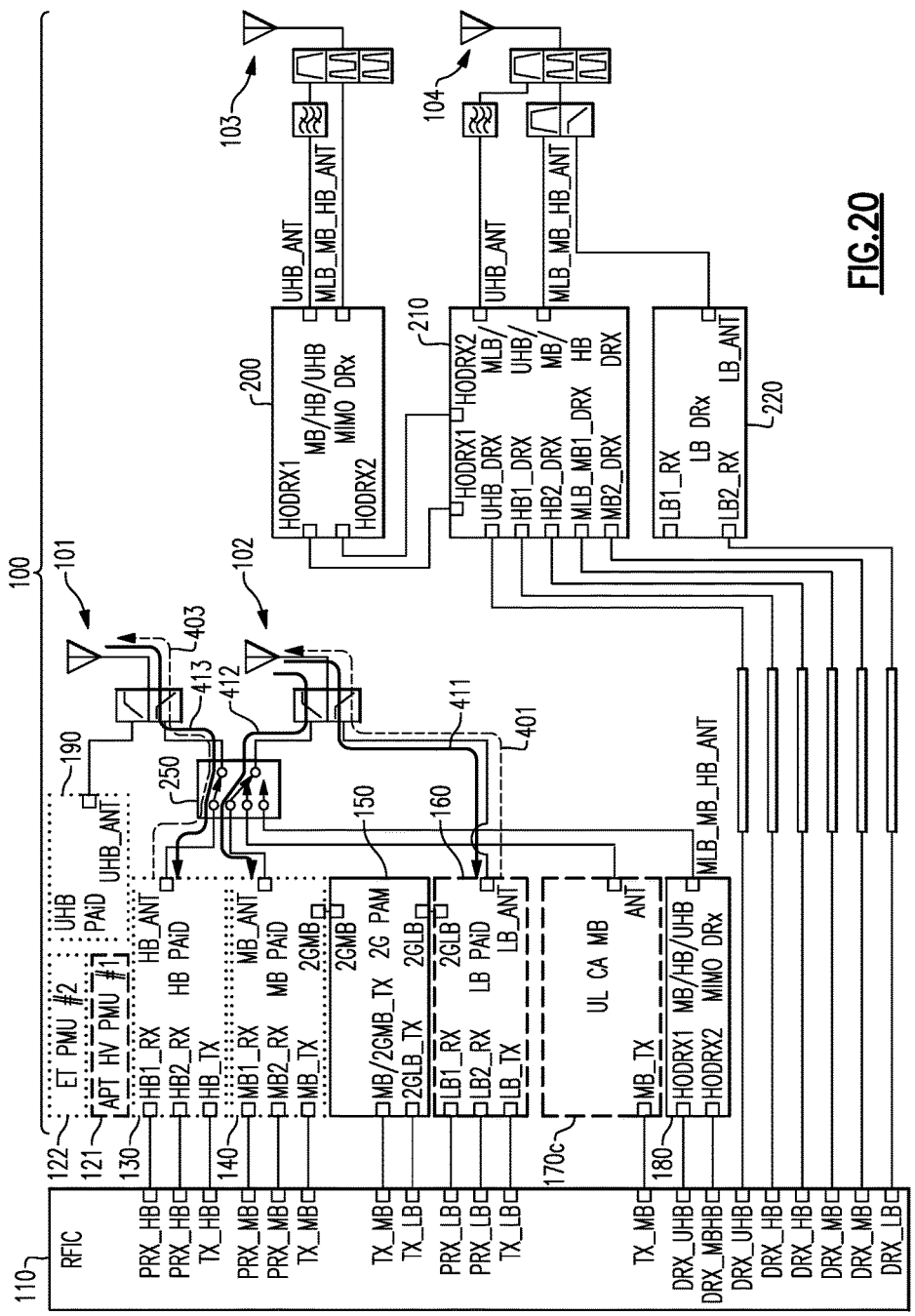
FIG. 20 shows an example of the front-end architecture of FIG. 16 being operated to provide uplink carrier aggregation in low-band and high-band, and downlink carrier aggregation in low-band, mid-band, and high-band.

FIG. 20 shows an example in which the front-end architecture 100 of FIG. 16 is being operated to provide low and high-band uplink carrier aggregation, and low, mid and high-band downlink carrier aggregation. For clarity, some of the reference numerals have been removed from FIG. 20; however, such parts correspond to the same in FIG. 16.

In FIG. 20, the low-band transmit operation is shown to be achieved by the LB PAiD module 160 and the second antenna 102, through a signal path indicated as 401. The high-band transmit operation is shown to be achieved by the HB PAiD module 130 and the first antenna 101, through a signal path indicated as 403.

In FIG. 20, the low-band receive operation is shown to be achieved by the second antenna 102 and the LB PAiD module 160, through a signal path indicated as 411. The mid-band receive operation is shown to be achieved by the second antenna 102 and the MB PAiD module 140, through a signal path indicated as 412. The high-band receive operation is shown to be achieved by the first antenna 101 and the HB PAiD module 130, through a signal path indicated as 413.

Figure 21:
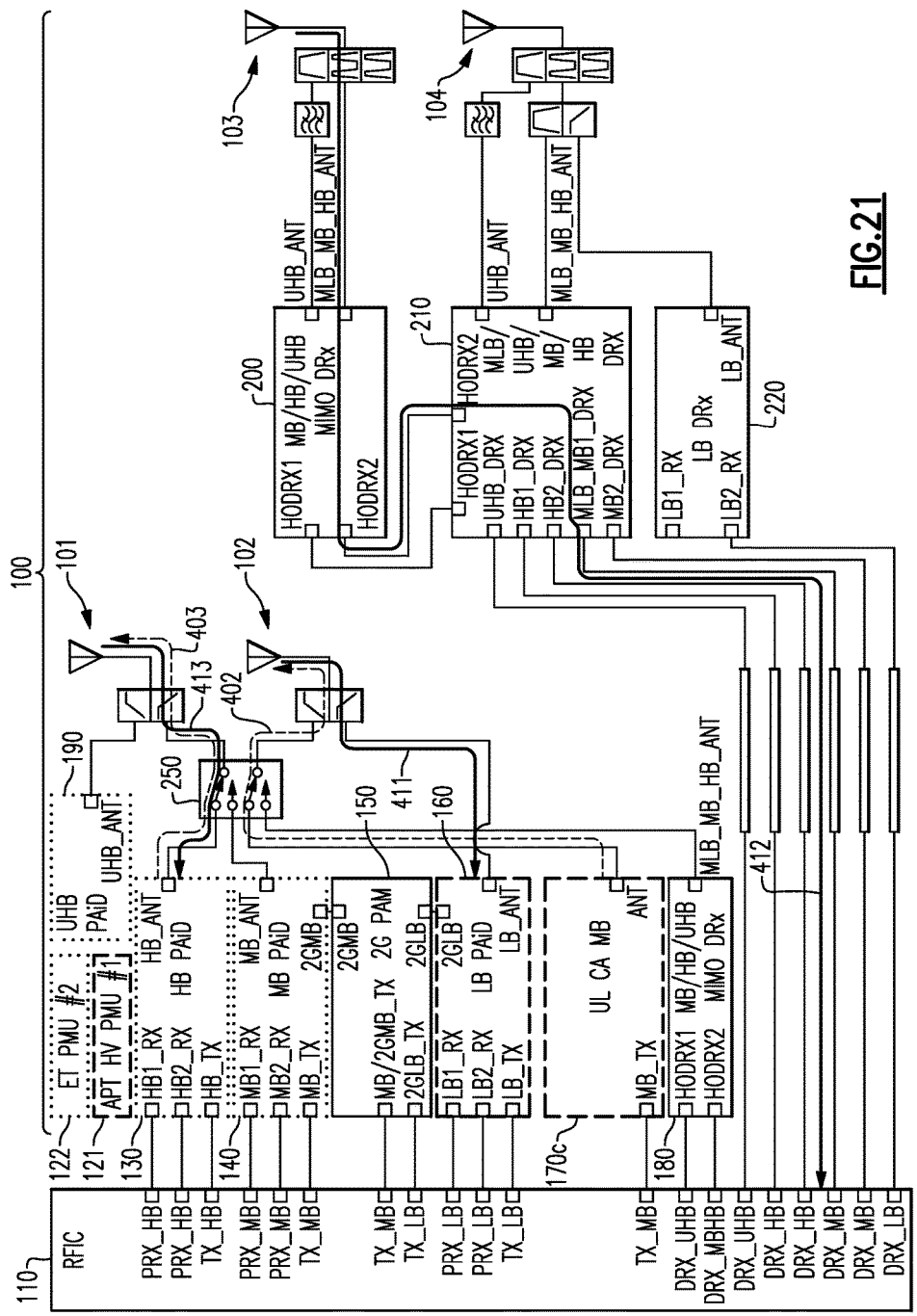
FIG. 21 shows an example of the front-end architecture of FIG. 16 being operated to provide uplink carrier aggregation in mid-band and high-band, and downlink carrier aggregation in low-band, mid-band, and high-band.

FIG. 21 shows an example in which the front-end architecture 100 of FIG. 16 is being operated to provide mid and high-band uplink carrier aggregation, and low, mid and high-band downlink carrier aggregation. For clarity, some of the reference numerals have been removed from FIG. 21; however, such parts correspond to the same in FIG. 16.

In FIG. 21, the mid-band transmit operation is shown to be achieved by the UL CA MB module 170c and the second antenna 102, through a signal path indicated as 402. The high-band transmit operation is shown to be achieved by the HB PAiD module 130 and the first antenna 101, through a signal path indicated as 403.

In FIG. 21, the low-band receive operation is shown to be achieved by the second antenna 102 and the LB PAiD module 160, through a signal path indicated as 411. The mid-band receive operation is shown to be achieved by the third antenna 103 and the DRX module 200, through a signal path indicated as 412. The high-band receive operation is shown to be achieved by the first antenna 101 and the HB PAiD module 130, through a signal path indicated as 413.

Figure 22:
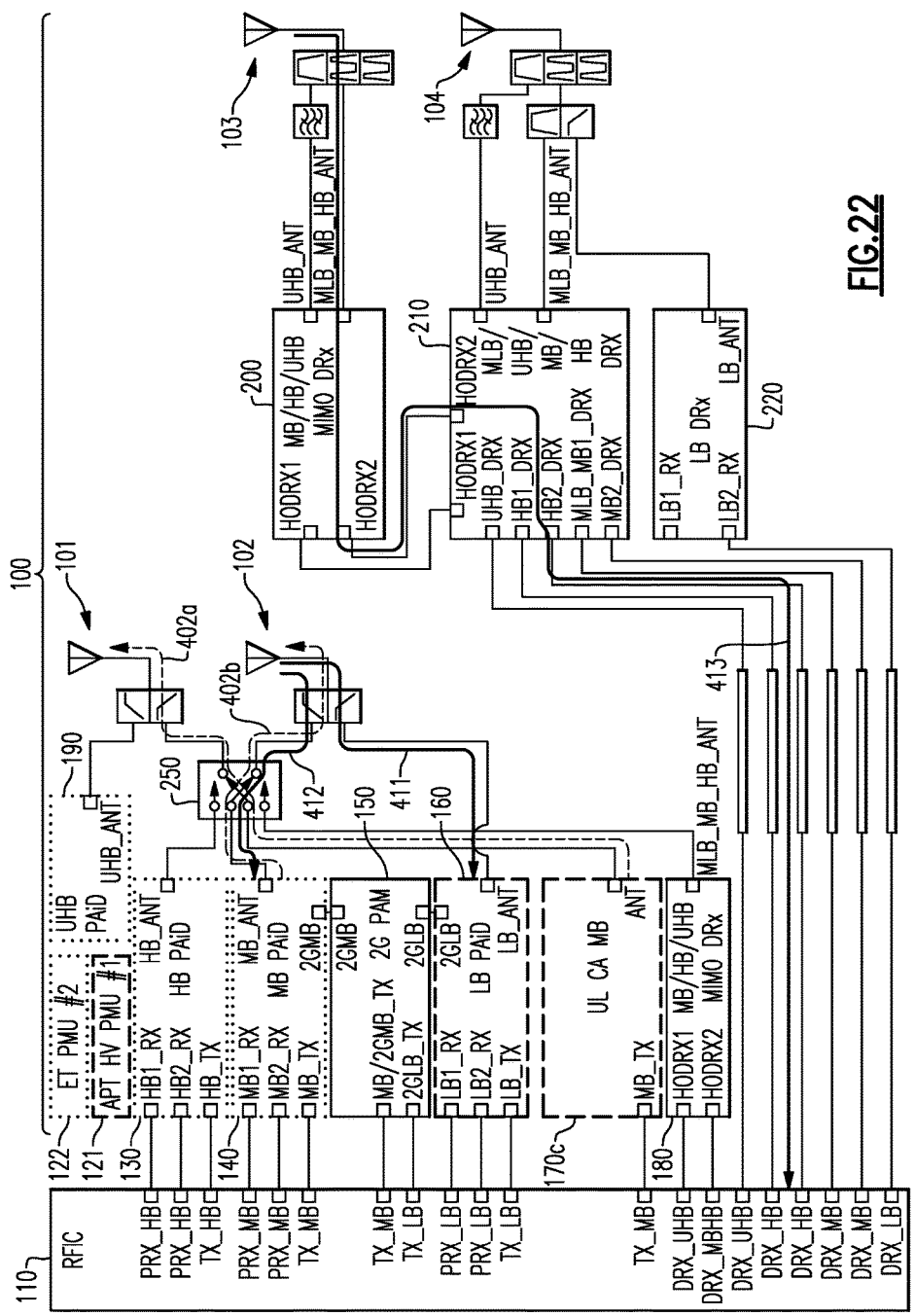
FIG. 22 shows an example of the front-end architecture of FIG. 16 being operated to provide uplink carrier aggregation in two mid-bands, and downlink carrier aggregation in low-band, mid-band, and high-band.

FIG. 22 shows an example in which the front-end architecture 100 of FIG. 16 is being operated to provide two mid-band uplink carrier aggregation, and low, mid and high-band downlink carrier aggregation. For clarity, some of the reference numerals have been removed from FIG. 22; however, such parts correspond to the same in FIG. 16.

In FIG. 22, the first mid-band transmit operation is shown to be achieved by the UL CA MB module 170c and the first antenna 101, through a signal path indicated as 402a. The second mid-band transmit operation is shown to be achieved by the MB PAiD module 140 and the second antenna 102, through a signal path indicated as 402b.

In FIG. 22, the low-band receive operation is shown to be achieved by the second antenna 102 and the LB PAiD module 160, through a signal path indicated as 411. The mid-band receive operation is shown to be achieved by the second antenna 102 and the MB PAiD module 140, through a signal path indicated as 412. The high-band receive operation is shown to be achieved by the third antenna 103 and the DRX module 200, through a signal path indicated as 413.

Example 6 of Front-End Architecture

FIG. 23 shows a sixth example front-end architecture 100 that can be implemented to provide various transmit (TX) and receive (RX) functionalities with a radio-frequency integrated circuit (RFIC) 110 and multiple antennas. For the purpose of description, the sixth example front-end architecture 100 of FIG. 23 is generally the same as the fifth example front-end architecture 100 of FIG. 16, other than a different antenna assignment for the UL CA MB module 170c. Accordingly, details concerning similar parts are described herein in reference to FIG. 16.

In the example of FIG. 23, the UL CA MB module 170c is shown to be implemented near and coupled to the third antenna 103. Accordingly, its input pin MB_TX is shown to be coupled to the corresponding pin TX_MB on the RFIC 110, through a relatively long path that can include a cross-device cable 267. The output pin ANT of the UL CA MB module 170c is shown to be coupled to the third antenna 103 through the DRX module 200. More particularly, the DRX module 200 can include a routing pin MB_TX that is coupled to the output pin ANT of the UL CA MB module 170c. The routing pin MB_TX can be coupled to the output pin MLB_MB_HB_ANT which is in turn coupled to the third antenna 103 as described herein.

It is noted that in the example of FIG. 23, the UL CA MB module 170c being operated with the APT HV supply from the first PMU 121 can allow such a module to be placed relatively far from the RFIC 110. It is also noted that the UL CA MB module 170c in FIG. 23 can be configured similar to the examples of FIGS. 17 and 18.

FIGS. 24-27 show examples of how the front-end architecture 100 of FIG. 23 can be configured to provide uplink (UL) and downlink (DL) carrier aggregation (CA) operations. Table 7 summarizes such UL and DL CA operations.

TABLE 7

| FIG. | Based on front-end architecture of: | UL functionality | DL functionality |
|---|---|---|---|
| 24 | FIG. 23 | LM | LMH |
| 25 | FIG. 23 | LH | LMH |
| 26 | FIG. 23 | MH | LMH |
| 27 | FIG. 23 | MM | LMH |

Figure 24:
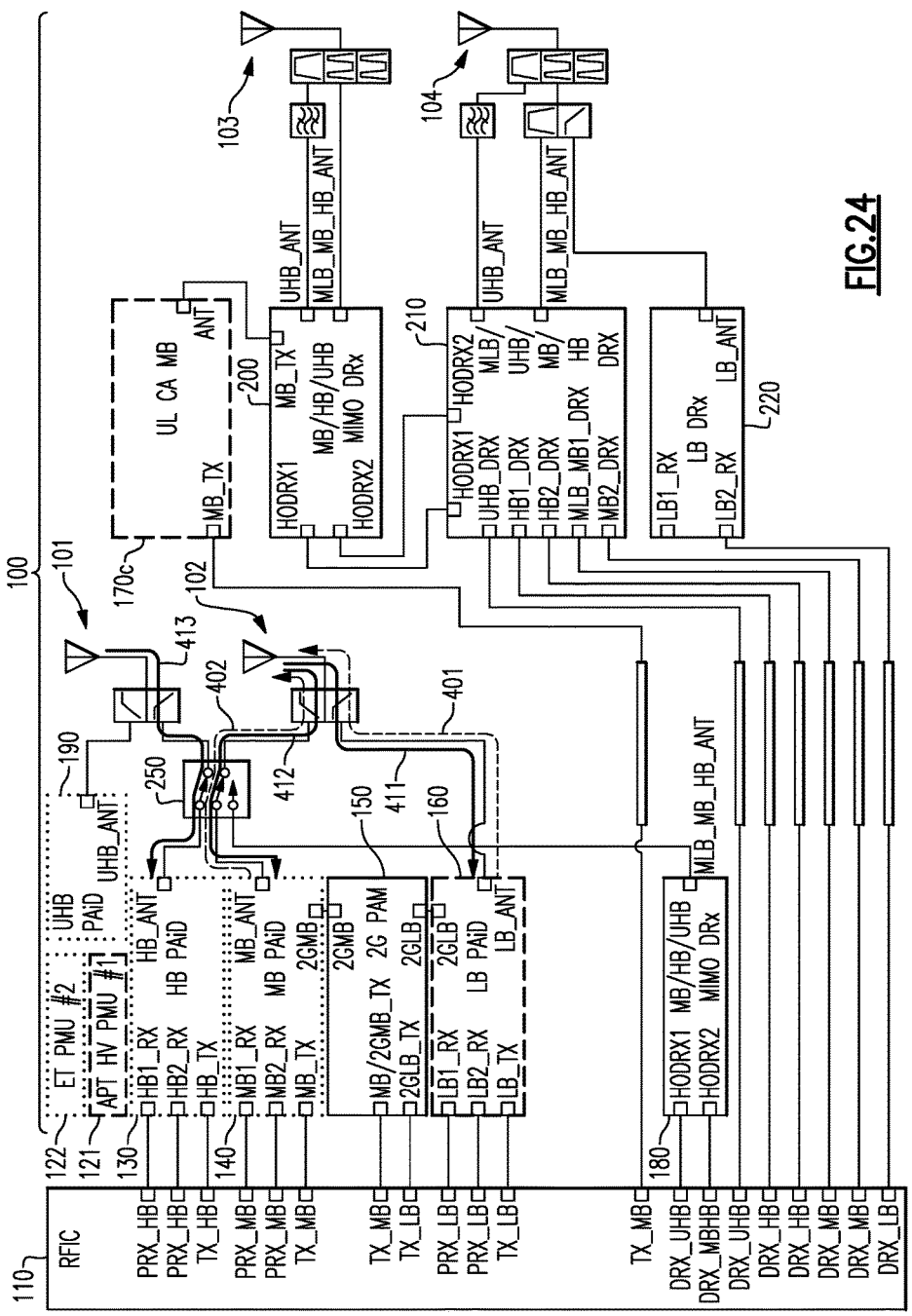
FIG. 24 shows an example of the front-end architecture of FIG. 23 being operated to provide uplink carrier aggregation in low-band and mid-band, and downlink carrier aggregation in low-band, mid-band, and high-band.

FIG. 24 shows an example in which the front-end architecture 100 of FIG. 23 is being operated to provide low and mid-band uplink carrier aggregation, and low, mid and high-band downlink carrier aggregation. For clarity, some of the reference numerals have been removed from FIG. 24; however, such parts correspond to the same in FIG. 23.

In FIG. 24, the low-band transmit operation is shown to be achieved by the LB PAiD module 160 and the second antenna 102, through a signal path indicated as 401. The mid-band transmit operation is shown to be achieved by the MB PAiD module 140 and the second antenna 102, through a signal path indicated as 402.

In FIG. 24, the low-band receive operation is shown to be achieved by the second antenna 102 and the LB PAiD module 160, through a signal path indicated as 411. The mid-band receive operation is shown to be achieved by the second antenna 102 and the MB PAiD module 140, through a signal path indicated as 412. The high-band receive operation is shown to be achieved by the first antenna 101 and the HB PAiD module 130, through a signal path indicated as 413.

Figure 25:
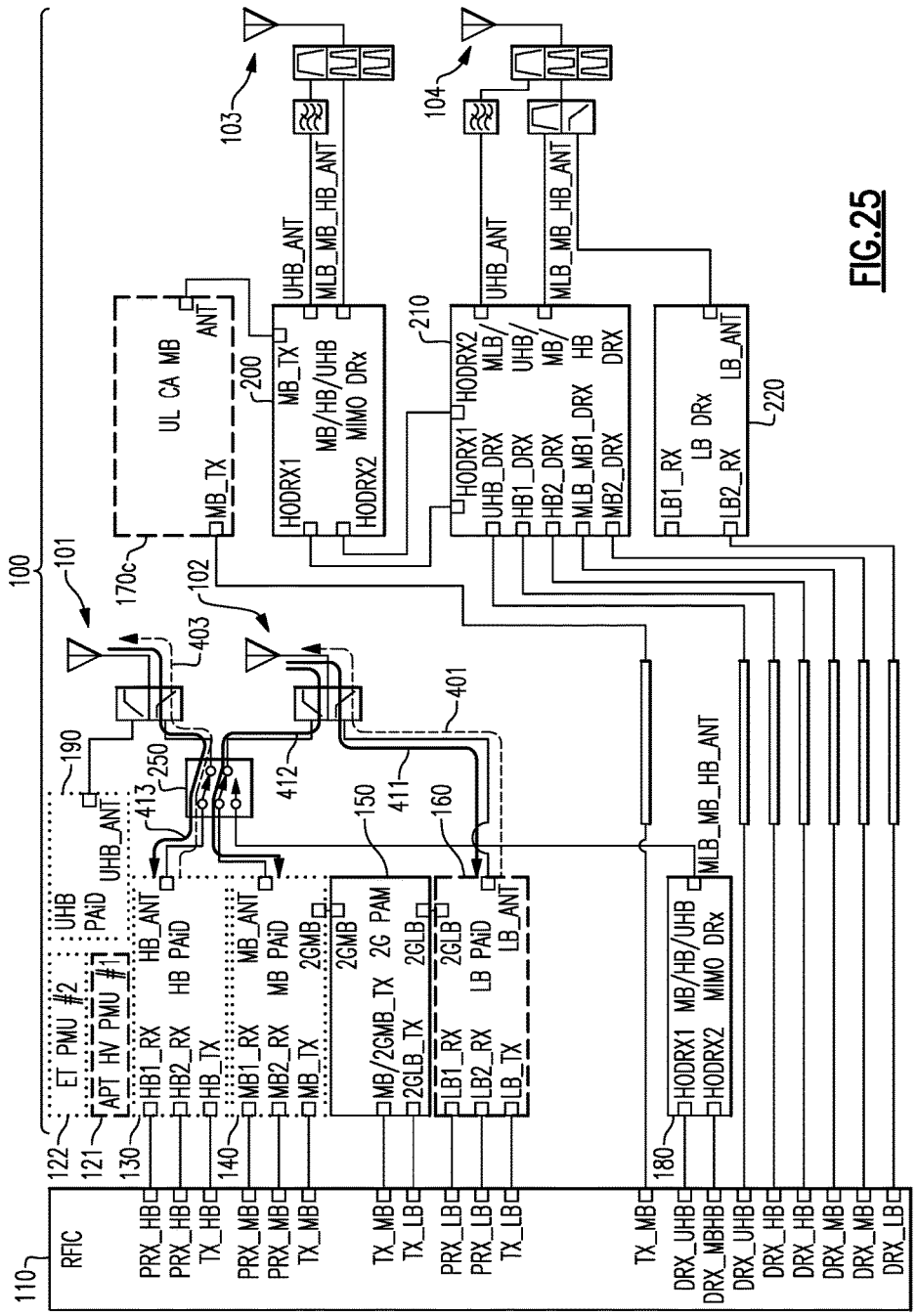
FIG. 25 shows an example of the front-end architecture of FIG. 23 being operated to provide uplink carrier aggregation in low-band and high-band, and downlink carrier aggregation in low-band, mid-band, and high-band.

FIG. 25 shows an example in which the front-end architecture 100 of FIG. 23 is being operated to provide low and high-band uplink carrier aggregation, and low, mid and high-band downlink carrier aggregation. For clarity, some of the reference numerals have been removed from FIG. 25; however, such parts correspond to the same in FIG. 23.

In FIG. 25, the low-band transmit operation is shown to be achieved by the LB PAiD module 160 and the second antenna 102, through a signal path indicated as 401. The high-band transmit operation is shown to be achieved by the HB PAiD module 130 and the first antenna 101, through a signal path indicated as 403.

In FIG. 25, the low-band receive operation is shown to be achieved by the second antenna 102 and the LB PAiD module 160, through a signal path indicated as 411. The mid-band receive operation is shown to be achieved by the second antenna 102 and the MB PAiD module 140, through a signal path indicated as 412. The high-band receive operation is shown to be achieved by the first antenna 101 and the HB PAiD module 130, through a signal path indicated as 413.

Figure 26:
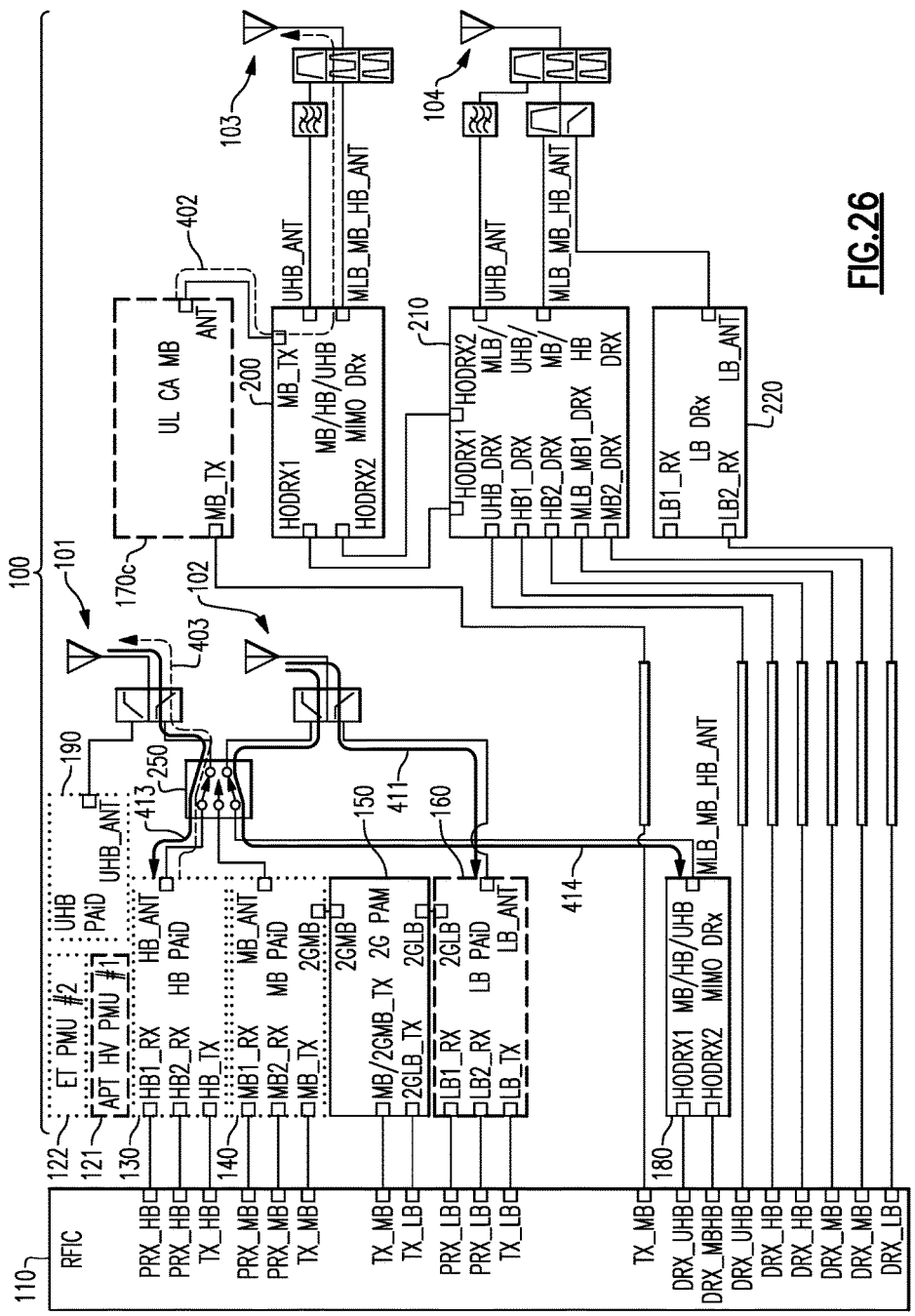
FIG. 26 shows an example of the front-end architecture of FIG. 23 being operated to provide uplink carrier aggregation in mid-band and high-band, and downlink carrier aggregation in low-band, mid-band, and high-band.

FIG. 26 shows an example in which the front-end architecture 100 of FIG. 23 is being operated to provide mid and high-band uplink carrier aggregation, and low, mid and high-band downlink carrier aggregation. For clarity, some of the reference numerals have been removed from FIG. 26; however, such parts correspond to the same in FIG. 23.

In FIG. 26, the mid-band transmit operation is shown to be achieved by the UL CA MB module 170c and the third antenna 103, through a signal path indicated as 402. The high-band transmit operation is shown to be achieved by the HB PAiD module 130 and the first antenna 101, through a signal path indicated as 403.

In FIG. 26, the low-band receive operation is shown to be achieved by the second antenna 102 and the LB PAiD module 160, through a signal path indicated as 411. The mid-band (or mid and high-band) receive operation is shown to be achieved by the second antenna 102 and the DRX module 180, through a signal path indicated as 414. The high-band receive operation is shown to be achieved by the first antenna 101 and the HB PAiD module 130, through a signal path indicated as 413.

Figure 27:
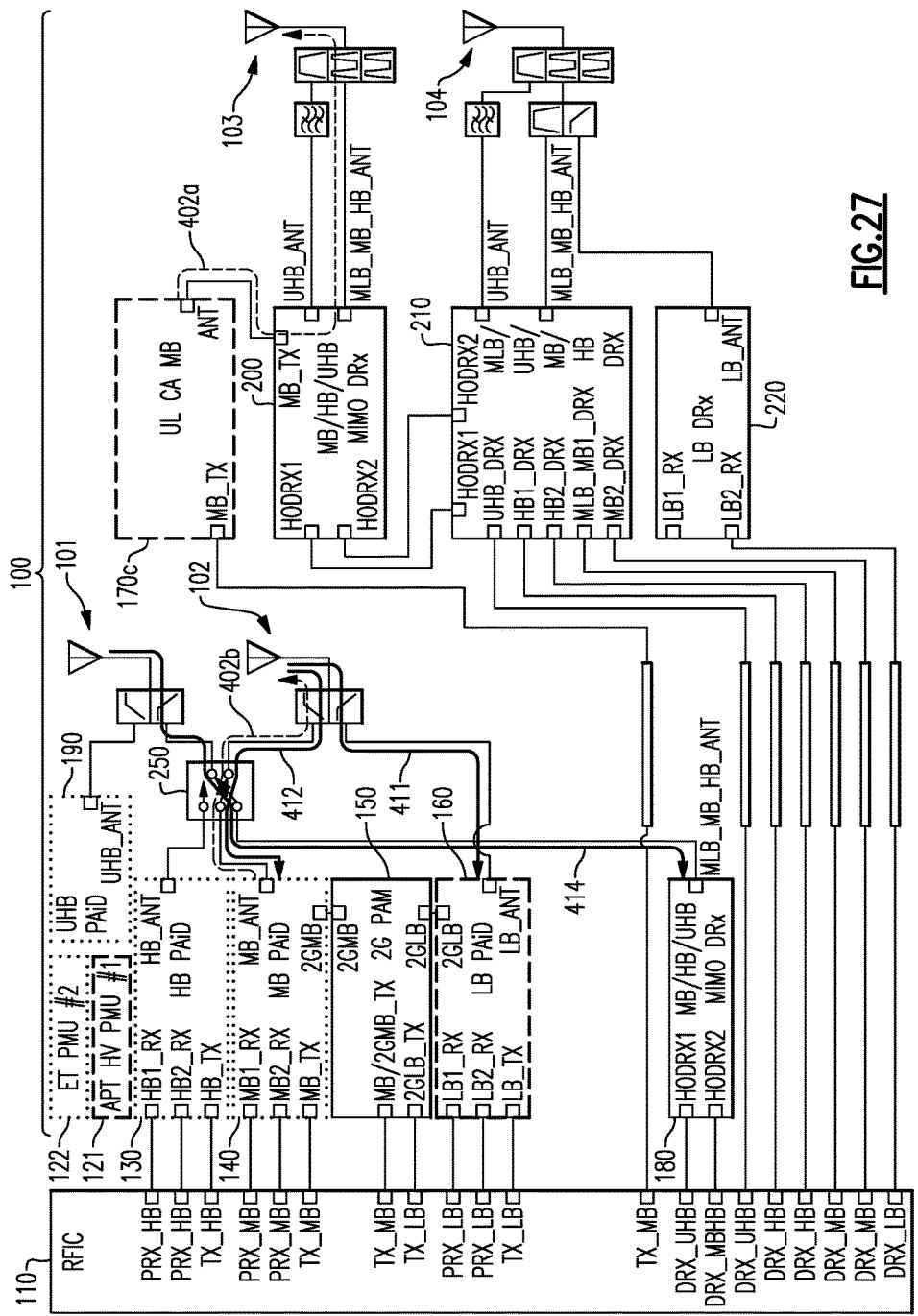
FIG. 27 shows an example of the front-end architecture of FIG. 23 being operated to provide uplink carrier aggregation in two mid-bands, and downlink carrier aggregation in low-band, mid-band, and high-band.

FIG. 27 shows an example in which the front-end architecture 100 of FIG. 23 is being operated to provide two mid-band uplink carrier aggregation, and low, mid and high-band downlink carrier aggregation. For clarity, some of the reference numerals have been removed from FIG. 27; however, such parts correspond to the same in FIG. 23.

In FIG. 27, the first mid-band transmit operation is shown to be achieved by the UL CA MB module 170*c* and the third antenna 103, through a signal path indicated as 402*a*. The second mid-band transmit operation is shown to be achieved by the MB PAiD module 140 and the second antenna 102, through a signal path indicated as 402*b*.

In FIG. 27, the low-band receive operation is shown to be achieved by the second antenna 102 and the LB PAiD module 160, through a signal path indicated as 411. The mid-band (or mid and high-band) receive operation is shown to be achieved by the second antenna 102 and the DRX module 180, through a signal path indicated as 412. The high-band receive operation is shown to be achieved by the third antenna 103 and the DRX module 200, through a signal path indicated as 414.

Examples of PA Modules

FIG. 28 shows an example of the HB PAiD module 130 that can be utilized in the front-end architectures of FIGS. 2, 9, 16 and 23. In the example of FIG. 28, the HB PAiD module 130 can be configured to provide frequency-division duplexing (FDD) functionality as well as time-division duplexing (TDD) functionality.

More particularly, the FDD portion of the HB PAiD module 130 can include a FDD power amplifier (PA) and a FDD LNA coupled to respective filters of a FDD duplexer. A common antenna connection from the FDD duplexer is shown to be coupled to the antenna pin HB_ANT through a mode selection switch 500.

In the example of FIG. 28, the TDD portion of the HB PAiD module 130 can include a TDD PA and a TDD LNA configured to operate with a T/R switch. An antenna node of such a T/R switch is shown to be coupled to the antenna pin HB_ANT through the mode selection switch 500.

In some embodiments, a TDD filter can be provided for either or both of transmit and receive operations. In the example of FIG. 28, such a filter is shown to be a component external to the HB PAiD module 130. Accordingly, appropriate connection pins 502, 504 can be provided to effectuate connections for the TDD filter.

In FIG. 28, the example HB PAiD module 130 can include the previously described input pin HB_TX and output pins HB1_RX, HB2_RX. Such input and output pins can be coupled to the FDD portion, the TDD portion, or some combination thereof.

FIG. 29 shows an example of the MB PAiD module 140 that can be utilized in the front-end architectures of FIGS. 2, 9, 16 and 23. In the example of FIG. 29, the MB PAiD module 140 can be configured to provide frequency-division duplexing (FDD) functionality for a plurality of bands.

More particularly, FDD circuitry for two bands are shown to be implemented in the MB PAiD module 140. A first FDD circuitry can include a first PA (PA_A) and a first LNA (LNA A) coupled to respective filters of a first duplexer. Similarly, a second FDD circuitry can include a second PA (PA B) and a second LNA (LNA B) coupled to respective filters of a second duplexer. A common antenna connection from each duplexer is shown to be coupled to the antenna pin MB_ANT through a band selection switch 510.

In the example of FIG. 29, the first and second bands can be any combination of specific mid-bands described herein.

In FIG. 29, the example MB PAiD module 140 can include the previously described input pin MB_TX and output pins MB1_RX, MB2_RX. Such input and output pins can be coupled to the first FDD circuitry, the second FDD circuitry, or some combination thereof.

FIG. 30 shows an example of the 2G PAM module 150 that can be utilized in the front-end architectures of FIGS. 2, 9, 16 and 23. In the example of FIG. 30, the 2G PAM module 150 can be configured to provide power amplification for a plurality of bands.

More particularly, power amplification for two 2G bands are shown to be implemented in the 2G PAM module 150. A 2G PA engine 520 can be configured to provide power amplification for a 2G low-band and a 2G mid-band. In some embodiments, the PA engine 520 can also provide power amplification for a non-2G mid-band signal.

In the example of FIG. 30, the low-band and mid-band signals can be received through the previously described input pins 2 BLB_TX and MB/2GMB_TX. The low-band and mid-band outputs of the PA engine 520 can be routed out of the 2G PAM module 150 through respective low pass filters (526 and 524), and through the previously described output pins 2GLB and 2GMB.

In the example of FIG. 30, the PA engine 520 is shown to be provided with a supply voltage through a supply pin VBATT. Further, some or all control functionality associated with the PA engine 520 can be provided by a controller such as a MIPI controller 522. Such a controller can be provided with appropriate supply and control signals through, for example, a supply pin VIO, a clock pin CLK, and a control data pin DATA.

Example of a Wireless Device

In some implementations, an architecture, device and/or circuit having one or more features described herein can be included in a wireless device. Such an architecture, device and/or circuit can be implemented directly in the wireless device, in one or more modular forms as described herein, or in some combination thereof. In some embodiments, such a wireless device can include, for example, a cellular phone, a smart-phone, a hand-held wireless device with or without phone functionality, a wireless tablet, a wireless router, a wireless modem configured to support machine type communications, a wireless access point, a wireless base station, etc. Although described in the context of wireless devices, it will be understood that one or more features of the present disclosure can also be implemented in other RF systems such as base stations.

Figure 31:
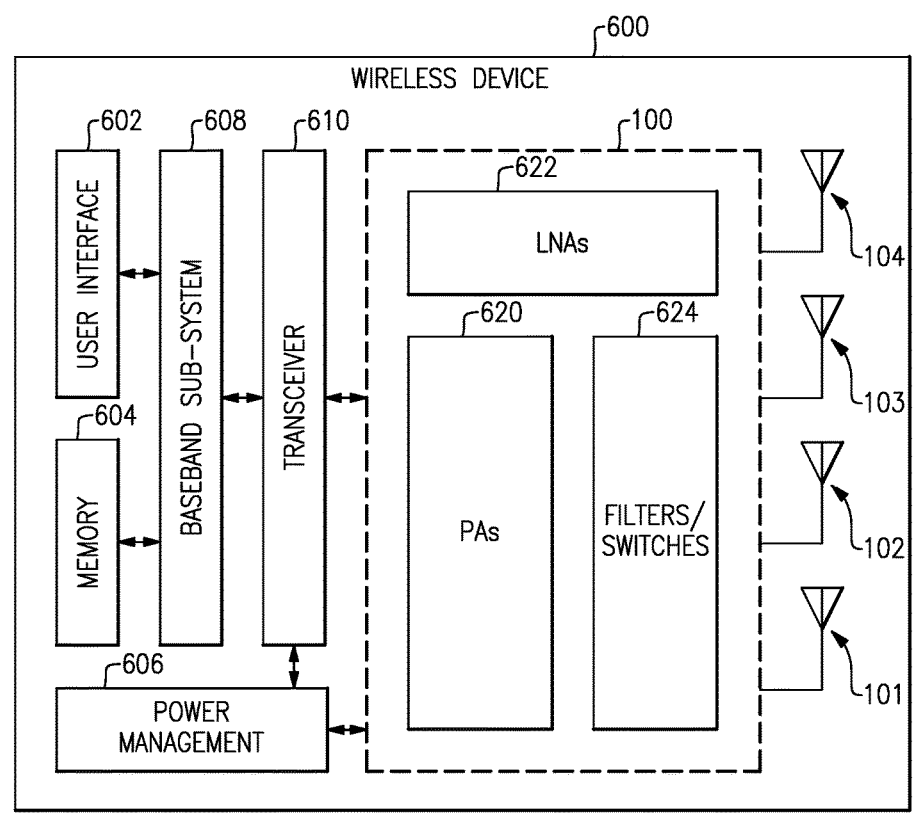
FIG. 31 depicts a wireless device having one or more features as described herein.

FIG. 31 depicts an example wireless device 600 having one or more advantageous features described herein. In some embodiments, such advantageous features can be implemented in a front-end (FE) architecture generally indicated as 100. In some embodiments, such a front-end architecture can be implemented one or more modules.

As described herein, such an front-end architecture can include, for example, an assembly of PAs 620 for amplifying signals to be transmitted, an assembly of LNAs 622 for amplification of received signals, and an assembly of filters and switches 624 for filtering of signals and routing of signals. As described herein, such a front-end architecture can provide support for multiple antennas, such as four antennas 101, 102, 103, 104.

PAs in the PA assembly 620 can receive their respective RF signals from a transceiver 610 that can be configured and operated to generate RF signals to be amplified and transmitted, and to process received signals. The transceiver 610 is shown to interact with a baseband sub-system 608 that is configured to provide conversion between data and/or voice signals suitable for a user and RF signals suitable for the transceiver 610. The transceiver 610 is also shown to be connected to a power management component 606 that is configured to manage power for the operation of the wireless device 600. Such power management can also control operations of the front-end architecture 100 and other components of the wireless device 600.

The baseband sub-system 608 is shown to be connected to a user interface 602 to facilitate various input and output of voice and/or data provided to and received from the user. The baseband sub-system 608 can also be connected to a memory 604 that is configured to store data and/or instructions to facilitate the operation of the wireless device, and/or to provide storage of information for the user.

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

One or more features of the present disclosure can be implemented with various cellular frequency bands as described herein. Examples of such bands are listed in Table 8. It will be understood that at least some of the bands can be divided into sub-bands. It will also be understood that one or more features of the present disclosure can be implemented with frequency ranges that do not have designations such as the examples of Table 8.

TABLE 8

| Band | Mode | Tx Frequency Range (MHz) | Rx Frequency Range (MHz) |
| --- | --- | --- | --- |
| B1 | FDD | 1,920-1,980 | 2,110-2,170 |
| B2 | FDD | 1,850-1,910 | 1,930-1,990 |
| B3 | FDD | 1,710-1,785 | 1,805-1,880 |
| B4 | FDD | 1,710-1,755 | 2,110-2,155 |
| B5 | FDD | 824-849 | 869-894 |
| B6 | FDD | 830-840 | 875-885 |
| B7 | FDD | 2,500-2,570 | 2,620-2,690 |
| B8 | FDD | 880-915 | 925-960 |
| B9 | FDD | 1,749.9-1,784.9 | 1,844.9-1,879.9 |
| B10 | FDD | 1,710-1,770 | 2,110-2,170 |
| B11 | FDD | 1,427.9-1,447.9 | 1,475.9-1,495.9 |
| B12 | FDD | 699-716 | 729-746 |
| B13 | FDD | 777-787 | 746-756 |
| B14 | FDD | 788-798 | 758-768 |
| B15 | FDD | 1,900-1,920 | 2,600-2,620 |
| B16 | FDD | 2,010-2,025 | 2,585-2,600 |
| B17 | FDD | 704-716 | 734-746 |
| B18 | FDD | 815-830 | 860-875 |
| B19 | FDD | 830-845 | 875-890 |
| B20 | FDD | 832-862 | 791-821 |
| B21 | FDD | 1,447.9-1,462.9 | 1,495.9-1,510.9 |
| B22 | FDD | 3,410-3,490 | 3,510-3,590 |
| B23 | FDD | 2,000-2,020 | 2,180-2,200 |
| B24 | FDD | 1,626.5-1,660.5 | 1,525-1,559 |
| B25 | FDD | 1,850-1,915 | 1,930-1,995 |
| B26 | FDD | 814-849 | 859-894 |
| B27 | FDD | 807-824 | 852-869 |
| B28 | FDD | 703-748 | 758-803 |
| B29 | FDD | N/A | 716-728 |
| B30 | FDD | 2,305-2,315 | 2,350-2,360 |
| B31 | FDD | 452.5-457.5 | 462.5-467.5 |
| B32 | FDD | N/A | 1,452-1,496 |
| B33 | TDD | 1,900-1,920 | 1,900-1,920 |
| B34 | TDD | 2,010-2,025 | 2,010-2,025 |
| B35 | TDD | 1,850-1,910 | 1,850-1,910 |
| B36 | TDD | 1,930-1,990 | 1,930-1,990 |
| B37 | TDD | 1,910-1,930 | 1,910-1,930 |
| B38 | TDD | 2,570-2,620 | 2,570-2,620 |
| B39 | TDD | 1,880-1,920 | 1,880-1,920 |
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |
| B44 | TDD | 703-803 | 703-803 |

General Comments:

For the purpose of description, it will be understood that a module can be a physical module and/or a functional block configured to provide a desired modular functionality with one or more devices and/or circuits. For example, a physical module can be a packaged module implemented on a packaging substrate, a packaged die configured to be mounted on a circuit board, or any other physical device configured to provide RF functionality. It will also be understood that a module can include one or more physical devices, including a plurality of physical devices with each sometimes being referred to as a module itself.

Also for the purpose of description, it will be understood that a component can be physical device and/or an assembly of one or more devices and/or circuits configured to provide a functionality. In some situations, a component can also be referred to as a module, and vice versa.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

The above description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. Claims and their equivalents are intended to cover such forms or modifications as would fall within the scope and spirit of the disclosure.

What is claimed is:

1. A front-end architecture for wireless application, comprising:
   a first module having a power amplifier with integrated duplexer, a second module having a power amplifier with integrated duplexer and configured to support an uplink carrier-aggregation operation, and a plurality of third modules each having a power amplifier with integrated duplexer;
   a first power management unit implemented to provide supply voltage for each of the first module and the second module; and
   a second power management unit implemented to provide supply voltage for each of the plurality of third modules, one of the first and second power management units configured to support an envelope tracking operation, and the other power management unit configured to support an envelope tracking operation or an average power tracking operation.

2. The front-end architecture of claim 1 wherein the third modules include a low-band power amplifier with integrated duplexer and a mid-band power amplifier with integrated duplexer.

3. The front-end architecture of claim 1 wherein the third modules include a mid-band power amplifier with integrated duplexer and a high-band power amplifier with integrated duplexer.

4. The front-end architecture of claim 1 wherein the first module includes a high-band power amplifier with integrated duplexer.

5. The front-end architecture of claim 1 wherein the first module includes a low-band power amplifier with integrated duplexer.

6. The front-end architecture of claim 1 wherein each of the first and second power management units is configured to support the respective envelope tracking operation.

7. The front-end architecture of claim 1 wherein one of the first and second power management units is configured to support the respective envelope tracking operation, and the other power management unit is configured to support the average power tracking operation.

8. The front-end architecture of claim 1 wherein the second module is configured to support the uplink carrier aggregation operation with at least two bands among a mid-band.

9. The front-end architecture of claim 1 wherein the front-end architecture is configured to provide downlink carrier aggregation with at least three bands among the low-band and the mid-low-band or higher frequency band.

10. A wireless device comprising:
    a transceiver configured to generate a plurality of transmit signals and process a plurality of received signals;
    a plurality of antennas configured to support transmission of the transmit signals and reception of the received signals; and
    a front-end system implemented between the transceiver and the plurality of antennas, and including a first module having a power amplifier with integrated duplexer, a second module having a power amplifier with integrated duplexer and configured to support an uplink carrier-aggregation operation, and a plurality of third modules each having a power amplifier with integrated duplexer, the front-end system further including a first power management unit implemented to provide supply voltage for each of the first module and the second module, and a second power management unit implemented to provide supply voltage for each of the plurality of third modules, one of the first and second power management units configured to support an envelope tracking operation, and the other power management unit configured to support an envelope tracking operation or an average power tracking operation.

11. The wireless device of claim 10 wherein the wireless device is a cellular phone.

12. A front-end architecture for wireless application, comprising:
    a first module having a high-band power amplifier, a second module having a power amplifier configured to support an uplink carrier-aggregation operation, and a plurality of third modules each having a non-high-band power amplifier;
    a first power management unit implemented to provide supply voltage for each of the first module and the second module; and
    a second power management unit implemented to provide supply voltage for each of the plurality of third modules, each of the first and second power management units configured to support an envelope tracking operation.

13. The front-end architecture of claim 12 wherein each of the first module and the third modules is configured such that the respective power amplifier is integrated with a respective duplexer.

14. The front-end architecture of claim 12 wherein the third modules include a low-band power amplifier.

15. The front-end architecture of claim 12 wherein the third modules include a mid-band power amplifier.

16. The front-end architecture of claim 12 wherein the second module is configured to support the uplink carrier aggregation operation with at least two bands among a mid-band.

17. The front-end architecture of claim 12 wherein the front-end architecture is configured to provide downlink carrier aggregation with at least three bands among the high-band and the non-high-bands.

* * * * *